United States Patent
Bayer, Sr. et al.

(10) Patent No.: US 9,356,784 B2
(45) Date of Patent: May 31, 2016

(54) CRYPTIC NOTES AND RELATED APPARATUS AND METHODS

(71) Applicant: FLEUR DE LIS GROUP, LLC, St. Louis, MO (US)

(72) Inventors: Joseph Bayer, Sr., St. Louis, MO (US); Jeffrey D. Pickett, St. Louis, MO (US); Richard B. Scherrer, St. Louis, MO (US)

(73) Assignee: FLEUR DE LIS GROUP, LLC, St. Louis, MO (US)

( * ) Notice: Subject to any disclaimer, the term of this patent is extended or adjusted under 35 U.S.C. 154(b) by 345 days.

(21) Appl. No.: 13/835,476

(22) Filed: Mar. 15, 2013

(65) Prior Publication Data

US 2013/0322616 A1    Dec. 5, 2013

Related U.S. Application Data

(60) Provisional application No. 61/653,849, filed on May 31, 2012.

(51) Int. Cl.
*H04L 9/00*   (2006.01)
*H04L 9/28*   (2006.01)
*G09C 5/00*   (2006.01)
*G06F 21/36*  (2013.01)

(52) U.S. Cl.
CPC .. *H04L 9/28* (2013.01); *G09C 5/00* (2013.01); *G06F 21/36* (2013.01)

(58) Field of Classification Search
CPC combination set(s) only.
See application file for complete search history.

(56) References Cited

U.S. PATENT DOCUMENTS

| | | | |
|---|---|---|---|
| 5,708,717 A | 1/1998 | Alasia | |
| 2006/0281512 A1* | 12/2006 | Rehm | 463/9 |
| 2011/0029902 A1 | 2/2011 | Bailey | |
| 2011/0197268 A1 | 8/2011 | Ravikumar et al. | |
| 2011/0225629 A1 | 9/2011 | Pai | |
| 2012/0084854 A1 | 4/2012 | Mualem et al. | |

FOREIGN PATENT DOCUMENTS

| | | |
|---|---|---|
| JP | 2009-282815 | 12/2009 |
| KR | 10-2009-0037264 | 4/2009 |
| KR | 10-2010-0005262 | 1/2010 |
| WO | 2005/091547 | 9/2005 |

OTHER PUBLICATIONS

"Anamorphic Writing," http://www.sheaff-ephemera.com/list/anamorphic_writing.html, Retrieved online Jun. 29, 2015, 3 pages.
"Wheel of Fortune," prior to May 31, 2011.

* cited by examiner

*Primary Examiner* — Ghazal Shehni
(74) *Attorney, Agent, or Firm* — Harness, Dickey & Pierce, P.L.C.

(57) ABSTRACT

A computer-implemented method is described. A message is received from a user via a user interface of a computer device. The message includes at least first and second portions. A virtual cryptic note is generated that includes the first portion of the message arranged in a first orientation, and the second portion of the message arranged in a second orientation that is rotated relative to the first orientation, with the second portion of the message overlapping the first portion of the message. The virtual cryptic note is provided to the user. Cryptic notes can be useful and entertaining, particularly when used online, in email and/or in social media.

20 Claims, 28 Drawing Sheets

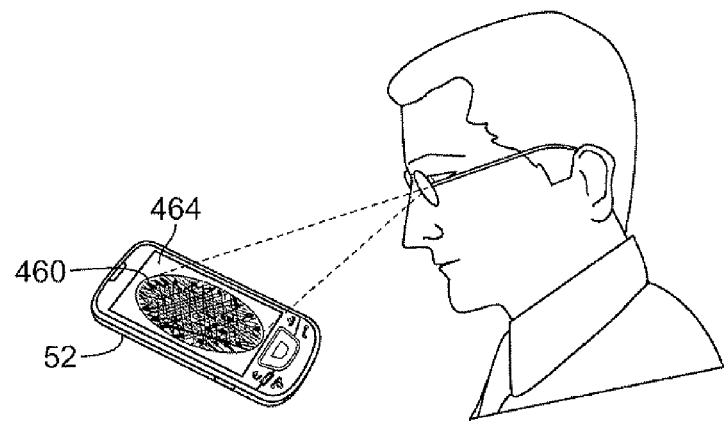
FIG. 8B
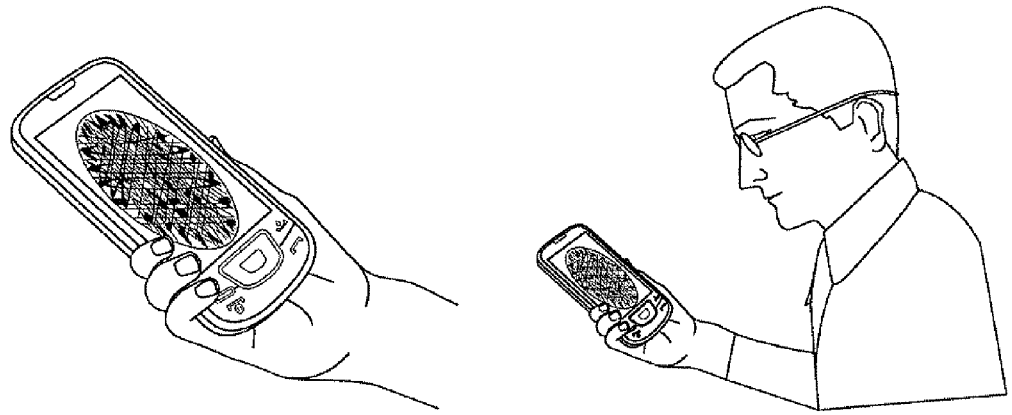
FIG. 8C
FIG. 8D
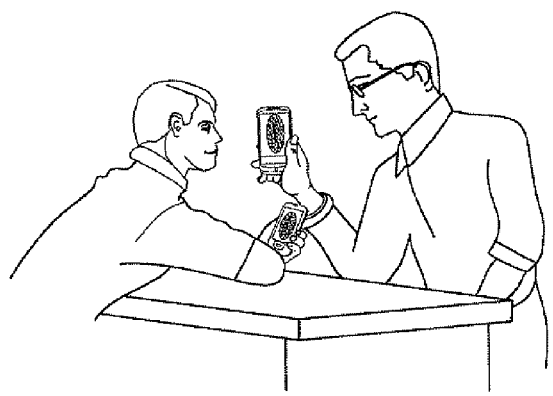
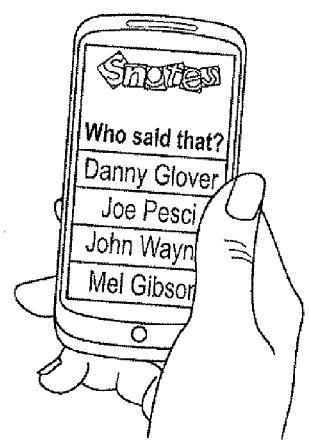
FIG. 8E
FIG. 8F

FIG. 10

CRYPTIC NOTES AND RELATED APPARATUS AND METHODS

CROSS-REFERENCE TO RELATED APPLICATION

This application claims the benefit of U.S. Provisional Application No. 61/653,849, filed on May 31, 2012. The entire disclosure of the above application is incorporated herein by reference.

FIELD

The present disclosure relates to cryptic notes and apparatus and methods related to cryptic notes.

BACKGROUND

This section provides background information related to the present disclosure which is not necessarily prior art.

Anamorphic writing has been used to obscure written messages by distorting the text, making it difficult to read a message except from a specific viewing angle. Anamorphic writing also has been used to make messages legible in particular viewing situations. For example, streets often have painted messages for "STOP" and "YIELD" in which the letters are elongated so they can be read by approaching vehicle drivers.

SUMMARY

This section provides a general summary of the disclosure, and is not a comprehensive disclosure of its full scope or all of its features.

According to one aspect of the present disclosure, a computer-implemented method is disclosed which includes receiving a message from a user via a user interface of a computer device. The message includes at least a first portion and a second portion. A virtual cryptic note is generated that includes the first portion of the message arranged in a first orientation, and the second portion of the message arranged in a second orientation that is rotated relative to the first orientation, with the second portion of the message overlapping the first portion of the message. The virtual cryptic note is provided to the user.

According to another aspect of the present disclosure, a three-dimensional object embodies a cryptic note. The cryptic note includes a message having at least a first message portion and a second message portion lying in substantially the same plane. The first message portion is arranged in a first orientation and the second portion is arranged in a second orientation that is rotated relative to the first orientation. The first message portion is substantially deciphered when the three-dimensional object is oriented at a viewing angle relative to a user and the second message is substantially deciphered when the three-dimensional object is rotated and oriented at said viewing angle or another viewing angle relative to the user.

According to yet another aspect of the present disclosure, a computer-implemented method includes receiving a virtual cryptic note that includes a message having at least first and second portions. The first portion is arranged in a first orientation and the second portion is arranged in a second orientation that is rotated relative to the first orientation with the second portion of the message overlapping the first portion of the message. The virtual cryptic note is displayed via a user interface of a computer device.

According to another aspect, a computer-implemented method includes, in response to user input, sending to a computer device a virtual cryptic note including a message having at least first and second portions. The first portion is arranged in a first orientation and the second portion is arranged in a second orientation that is rotated relative to the first orientation with the second portion of the message overlapping the first portion of the message.

According to still another aspect of the present disclosure, a method performed by a computer includes, in response to user input, virtually manipulating a virtual cryptic note including a message having at least first and second portions. The first portion is arranged in a first orientation and the second portion is arranged in a second orientation that is rotated relative to the first orientation with the second portion of the message overlapping the first portion of the message. The manipulating is performed at least in part to display the virtual cryptic note in a deciphered form via a user interface of the computer.

Further aspects and areas of applicability will become apparent from the description provided herein. It should be understood that various aspects of this disclosure may be implemented individually or in combination with one or more other aspects. It should also be understood that the description and specific examples herein are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIGS. 8A-8F are illustrations of example user computer devices via which cryptic notes may be displayed to users in accordance with one implementation of the disclosure;

FIG. 10 is an illustration of a user computer device screen displaying a tweet in accordance with one implementation of the disclosure;

Corresponding reference numerals indicate corresponding parts throughout the several views of the drawings.

DETAILED DESCRIPTION

Example embodiments will now be described more fully with reference to the accompanying drawings.

The inventors have observed that people enjoy solving puzzles in which one discovers hidden messages, e.g., by finding letters missing in a message and/or by rearranging words of a message. One aspect of the explosive growth of personal computing and the use of portable communication devices is the merger of forms of communication with those of entertainment. Online games and other computer-based entertainment have become extremely popular among both adults and children. Social media such as Twitter® and Facebook® are widely used for entertainment and game play as well as for communication.

The inventors have concluded that it could be highly entertaining if, e.g., someone could compose a message on a computer and watch an animated sequence in which the message becomes hidden in a virtual puzzle. The user could send the puzzle to an intended recipient, who could find it entertaining to perform a sequence of movements or watch an animated sequence by which the message emerges from the puzzle and assumes a deciphered form. In one example implementation of the present disclosure, a computer-implemented method includes receiving a message from a user via a user interface of a computer device. The message includes at least a first portion and a second portion. The method further includes generating a virtual cryptic note and displaying the virtual cryptic note to the user. The virtual cryptic note includes the first portion of the message arranged in a first orientation, and the second portion of the message arranged in a second orientation that is rotated relative to the first orientation with the second portion of the message overlapping the first portion of the message. In response to user input, the virtual cryptic note may be transmitted to a third party.

Figure 1:
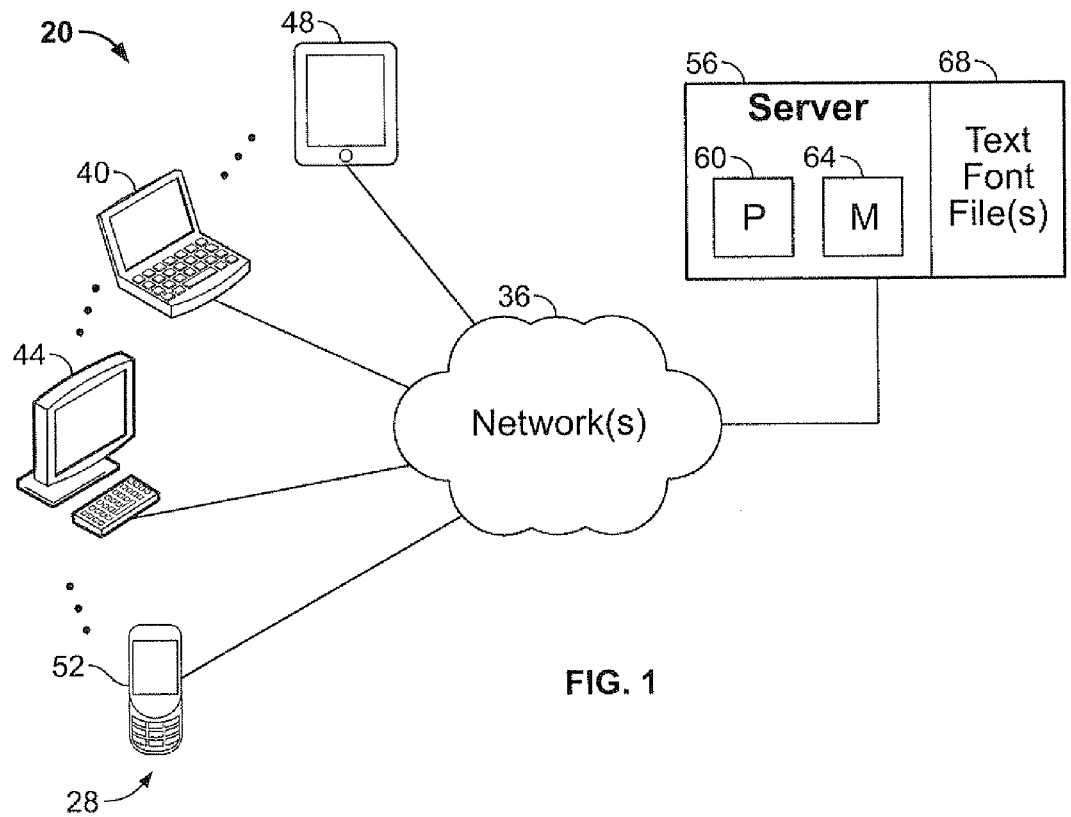
FIG. 1 is a diagram of a system for providing cryptic notes in accordance with one example embodiment of the present disclosure.

One configuration of a system for providing cryptic notes is indicated generally in FIG. 1 by reference number 20. One or more user computer devices 28 configured with displays 30 are connected with one or more networks 36, which may include but are not limited to the Internet, cellular network(s), intranets, other internets, and/or combinations of various networks, etc. The user computer devices 28 may be mobile, stationary, and/or of various types, including but not limited to portable computer(s) 40 (including laptop(s)), desktop(s) 44, tablet(s) 48, mobile phone(s) 52 (including smart phone(s)), etc. One or more computers, e.g., server(s) 56, may be available for access by user computer devices 28 through the network(s) 36. The server(s) 56 have one or more processors 60 and memory 64 and may include and/or have access to one or more text font files 68. A font file 68 may describe shapes of characters for a particular font and also may describe ways in which such characters may be kerned to improve their appearance when rendered graphically. A single server 56 is shown in the example configuration of FIG. 1.

Figure 18:
FIG. 18 is an illustration of a kiosk for use in sending and/or receiving cryptic notes in accordance with one implementation of the disclosure.

It should be understood generally that various types of computers, processors, microprocessors, memory configurations, etc. could be used to execute computer-executable instructions for performing various methods in various implementations of the present disclosure. The terms "user computer device," "user interface", and "user input device" are broadly construed in this disclosure and in the claims to include many different types of devices, hardware, firmware, and software. For example, user computer devices may include (in addition to computers, processors, microprocessors, etc.) devices that are different from conventional computers and processors. For example, network-capable and/or programmable devices such as watches, toys, cable televisions, gaming devices, appliances, etc. could be used in various ways in creating, viewing, sending, receiving, and/or using cryptic notes as described herein. User input devices may include manually operated and other types of devices, including but not limited to keyboards, computer mice, touch screens, memory sticks, computer disks, microphones, joy sticks, push buttons, scanners, etc. In some embodiments, a kiosk, e.g., as shown in FIG. 18, may be provided at which a user may create, send, receive and/or view a cryptic note.

Figure 2A:
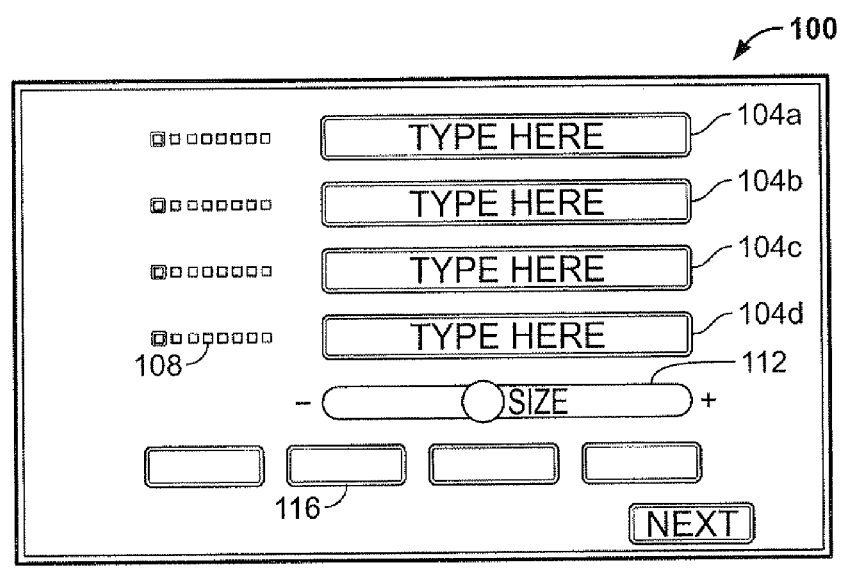
FIG. 2A is an illustration of a display screen on which a user may input a message in accordance with one implementation of the disclosure.
Figure 2B:
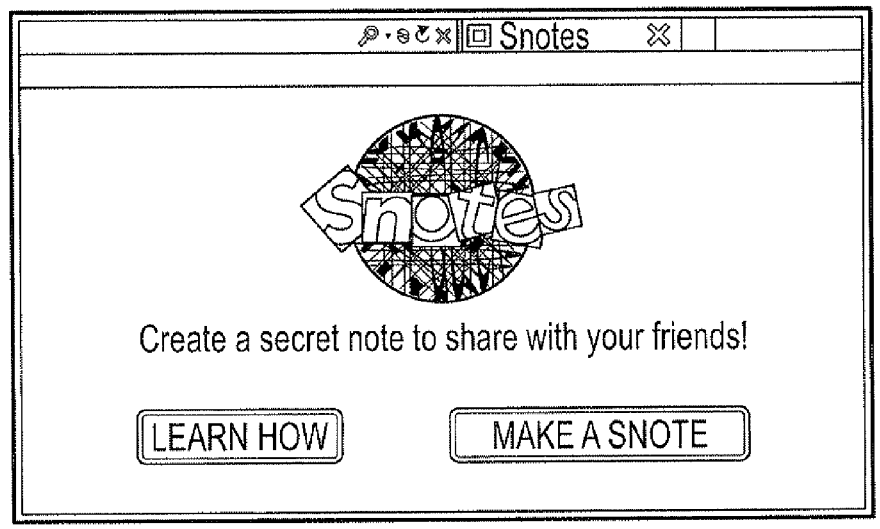
FIGS. 2B-2I are illustrations of a sequence of display screens displayed to a user and by which the user may input message portions for a cryptic note in accordance with one implementation of the disclosure.
Figure 2C:
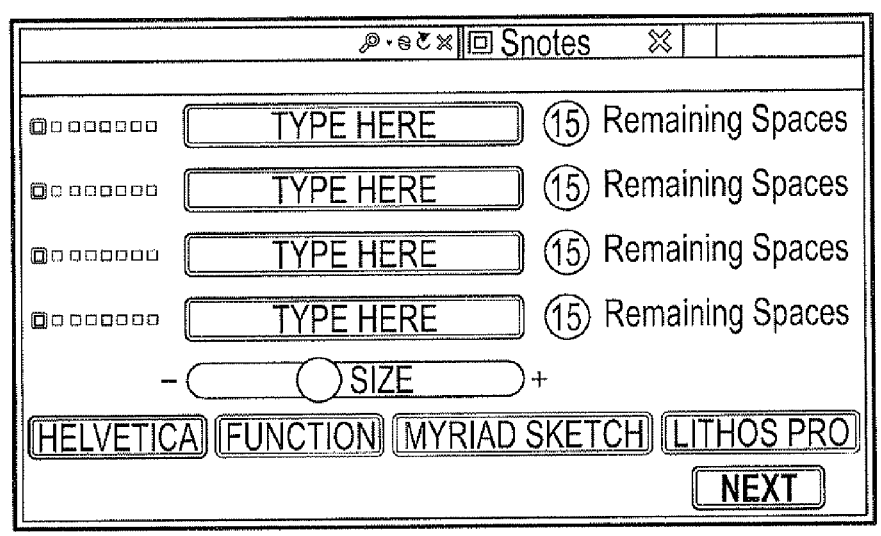
Figure 2D:
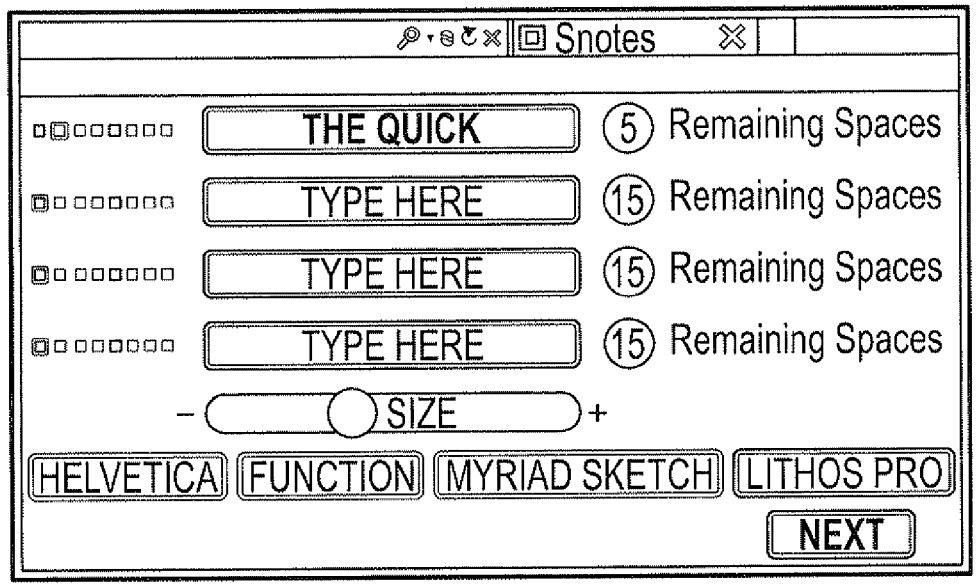
Figure 2E:
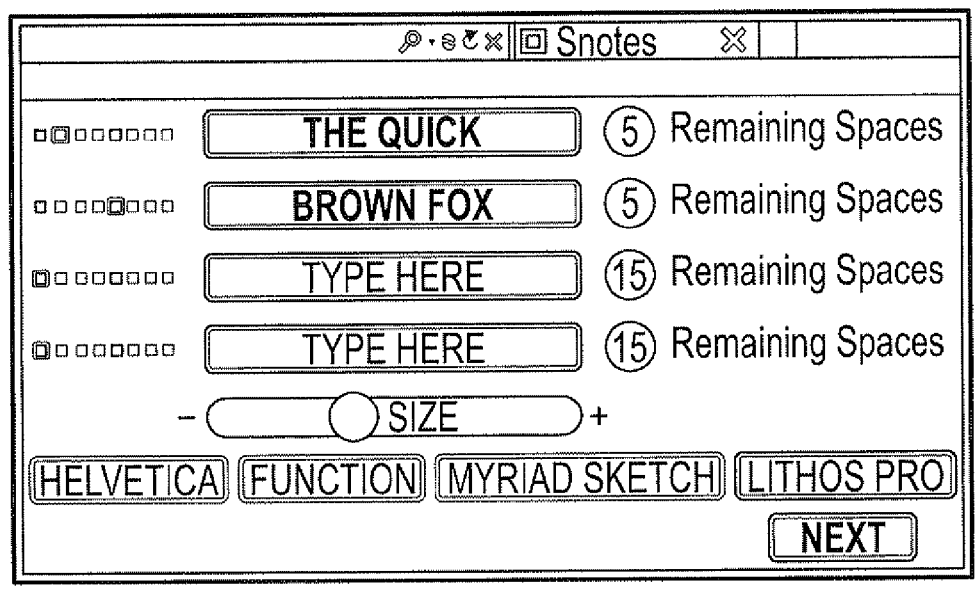
Figure 2F:
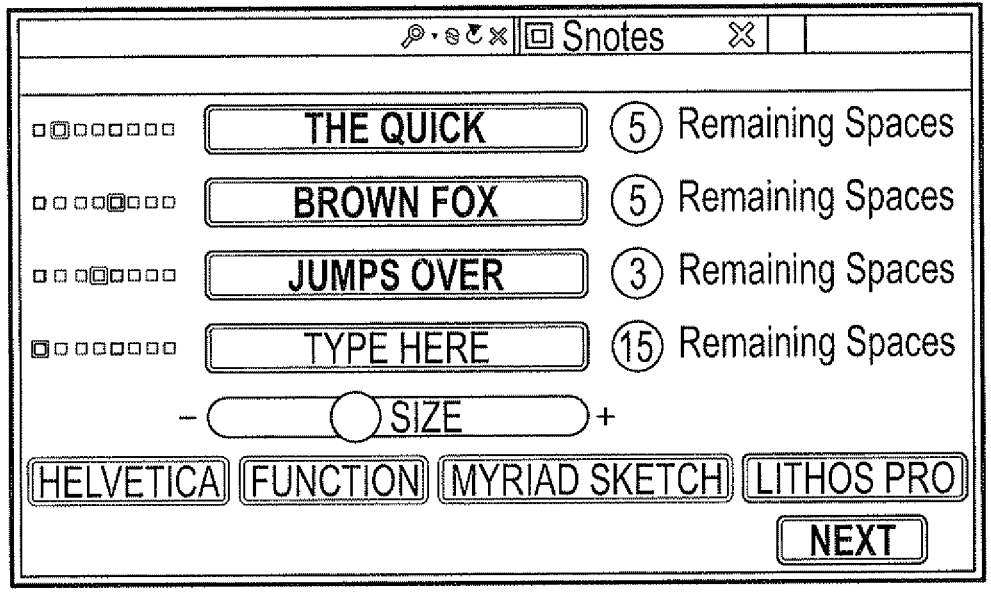
Figure 2G:
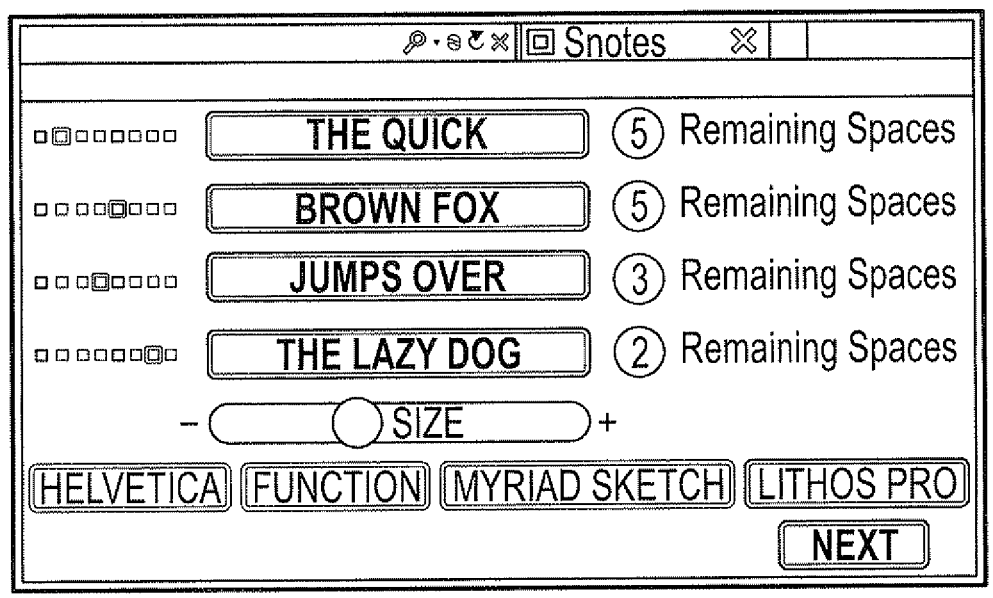
Figure 2H:
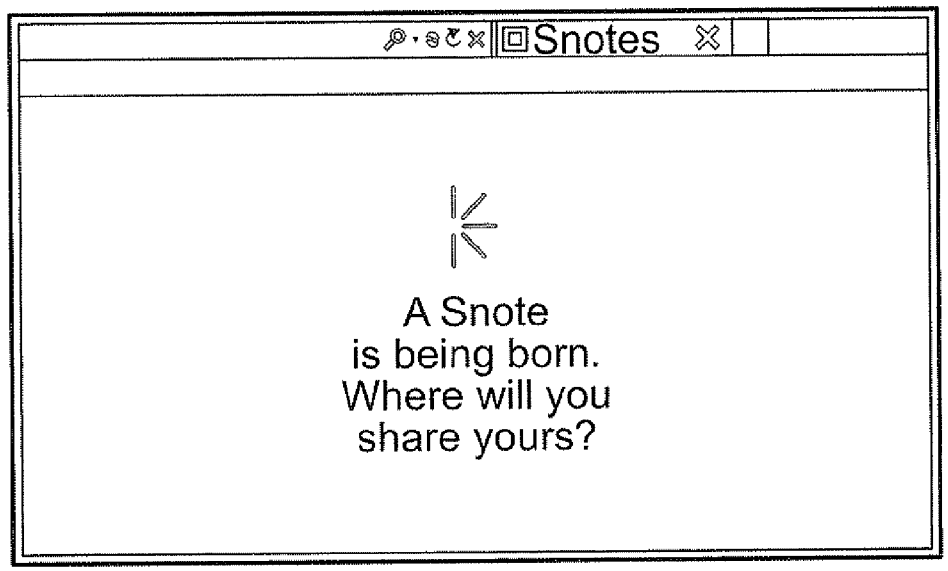
Figure 2I:
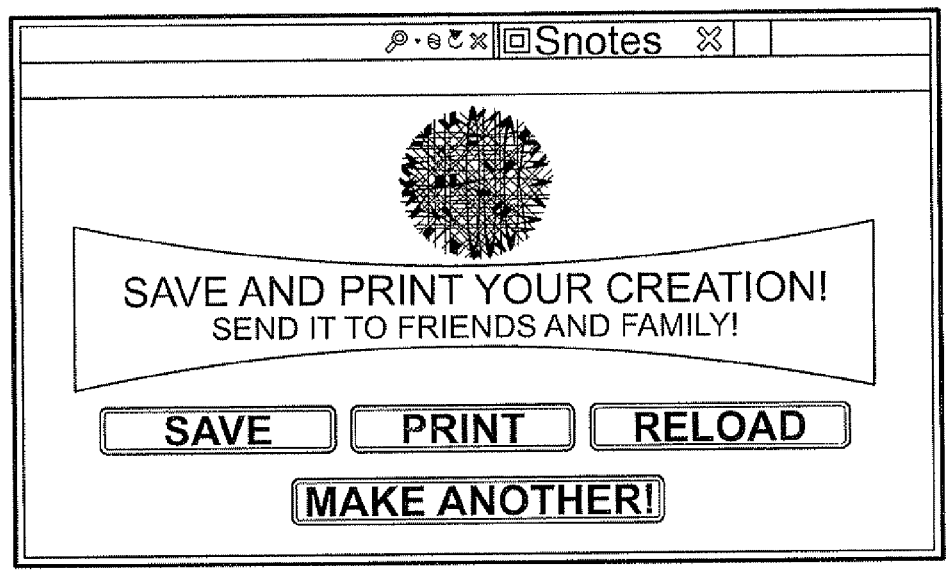

In one example implementation, a user who wishes to compose a cryptic note may use a browser of a user computer device 28 to access an Internet website. The website may be available on or through the server 56. An example display screen transmitted to the user computer device 28 from the website is indicated generally in FIG. 2A by reference number 100. The screen 100 includes a plurality of areas 104a-104d into which the user may use an input device, e.g., a keyboard of the user computer device 28 to enter a plurality of portions of a message. In the present example, areas 104a-104d are provided for four message portions, although in other embodiments the number of message portions could be less than four or greater than four. Each message portion may include letters, numbers, and/or other or additional characters, e.g., punctuation characters. In some embodiments, a counter may be displayed for each message portion, whereby a user may keep track of how many characters are remaining in which to input a message portion. Each area 104a-104d is associated with a plurality of color selection buttons 108 whereby the user may select a color for each message portion. A sizing bar 112 allows the user to select a size for a shape having a perimeter within which the cryptic note is to be shaped. An example sequence of display screens whereby a user may input message portions to create a cryptic note are shown in FIGS. 2B-2I.

In the present example, the shape is a circle. In some other embodiments, however, a user is allowed to select or draw a shape, e.g., a square, octagon, pentagon, an ellipse, a circle, etc. A shape may be that of substantially any polygon or closed curve. In some embodiments a shape may be random. In the present example, a circle that includes a cryptic note may range from about 0.75 inches to about 8 inches in diameter, although other or additional sizes and size ranges are possible. Multiple buttons 116 are provided whereby the user may select, e.g., a font in which the cryptic note is to be rendered. The number of buttons 116 may vary depending on different functionalities that may be provided. In some other implementations, the user may be allowed to select different fonts for different portions of a message. Fonts may include commercially available fonts and/or custom fonts. In various embodiments, a user may select, e.g., background coloration, graphics, and/or bordering for a cryptic note.

Additionally or alternatively, a message portion may include one or more images. An image may include, but is not limited to, a symbol, a drawing, a mark, a photograph, a picture, etc. A user may, e.g., use functionality provided through one or more buttons 116 to upload one or more images, e.g., from a user computer device 28 to the server 56, for inclusion in one or more message portions.

Additionally or alternatively, a user may incorporate one or more degrees of difficulty that a recipient may encounter in attempting to decipher a cryptic note. For example, the user may specify particular alignment(s) of letters, characters and/or message portions configured to increase difficulty in deciphering. The user may also, e.g., specify that letters/characters of a message (and/or words of a message) be scrambled, and/or that a random sequence be used in displaying message portions for deciphering. Additionally or alternatively, the user may choose to scramble the axis points from which portions of the message or phrases are deciphered. Axis points may be altered and not always appear in the same place along the boundary of the closed shape in which the message may be provided. Portions of each message may be reversed, flipped or flopped along variable axis points to challenge and entertain viewers.

When the user has entered the information requested in the screen 100, a virtual cryptic note may be generated and displayed. On an example display screen indicated generally in FIG. 3 by reference number 130, a virtual cryptic note 134 is displayed on the user computer device 28 along with multiple user option buttons 136 relating to the note 134. The user may activate a "save" button 138 and/or "print" button 142 to save and/or print the note 134, and/or may activate a button 146 to return to the display 100 (shown in FIG. 2) in order to compose another cryptic note.

The user may activate a "send" button 148 to cause the user computer device 28 to send the virtual cryptic note to a destination entered by the user. For example, upon selecting the "send" button 148, the user may be presented with one or more options for selecting a way in which the virtual cryptic note may be sent. A user may choose, e.g., to transmit the virtual cryptic note 134 to another computer, e.g., by e-mail, by text message, by posting to a social website, etc., and may enter a phone number, email or other computer device address information for the recipient. In response, the user computer device 28 may attach, copy or otherwise include the virtual cryptic note 134 in a text message, email or other type of message and transmit the message to the indicated phone number or address. Additionally or alternatively, the user may choose to send the virtual cryptic note 134 as a real cryptic note, e.g., to a real postal address. In response, the user computer device 28 may cause the cryptic note 134 to be printed, e.g., along with an envelope displaying postal or other physical address information entered by the user. Additionally or alternatively, a user may cause the cryptic note 134 to be printed and/or may hand-deliver the printed note to a recipient.

Figure 3:
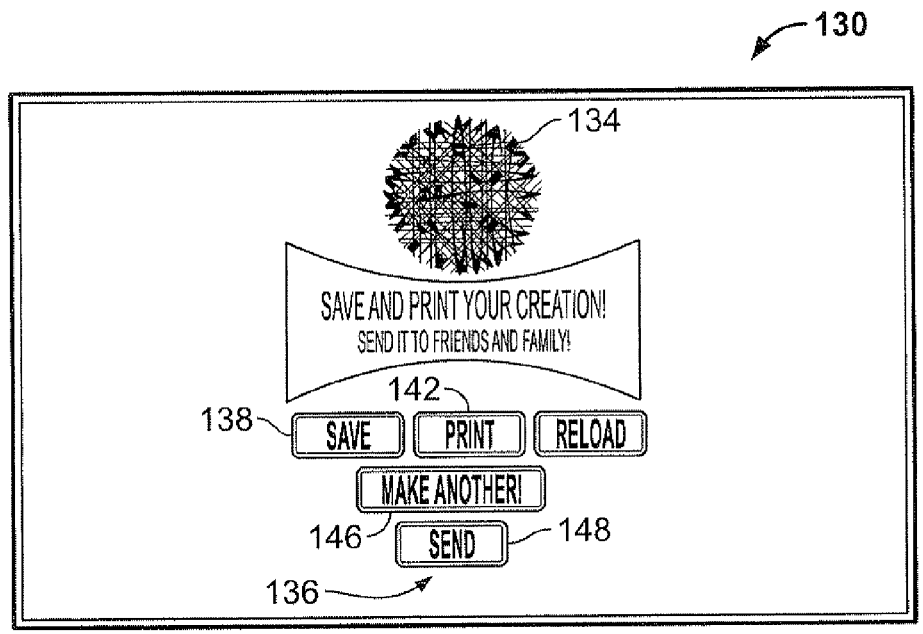
FIG. 3 is an illustration of a display screen on which a virtual cryptic note is displayed in accordance with one implementation of the disclosure.

In another example embodiment in which a user computer device 28 is a mobile phone 52 or other mobile device, a mobile application may be downloaded, e.g., from the server 56 or other software source, to provide the same or similar capabilities for receiving a message from a user of the computer device 28, generating a virtual cryptic note and/or providing user options relating to the virtual cryptic note, e.g., as previously described with reference to FIGS. 2 and 3. Additionally or alternatively, the downloaded application may provide automatic manipulation of, and/or allow the user to virtually manipulate, a cryptic note as further described below.

In various embodiments, a computer device may include computer-executable instructions for processing letters, numbers, symbols, pictures, etc. keyed in or otherwise input by a user to create a cryptic note. Such a computer device may be instructed, e.g., to stretch each character of a message portion and conform the characters to the boundaries of a surrounding shape. Each additional message portion may be stretched, conformed, rotated, and layered with other message portions to create a cryptic note. A string of stretched characters input by a user as a message portion becomes readable when viewed at an appropriate angle in perspective. A viewer of the cryptic note rotates and manipulates the entire note to appropriate angles, to visually foreshorten each message portion in order to decipher each message portion.

Figure 4:
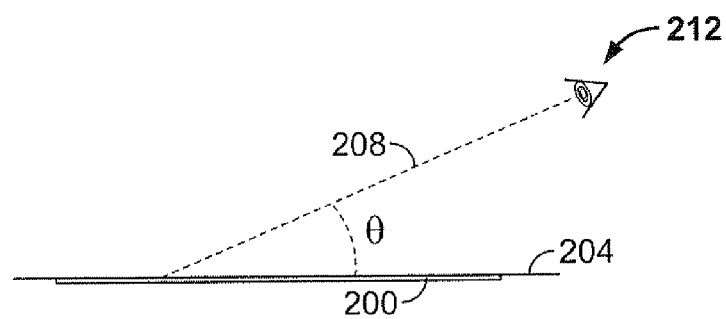
FIG. 4 is a diagram of a viewing angle for viewing a message portion of a cryptic note in accordance with one example embodiment.

A virtual cryptic note may be generated, e.g., in the following manner for an example message "the quick brown fox jumps over the lazy dog." It is assumed for purposes of explanation that a user has chosen to enter "THE QUICK", "BROWN FOX", JUMPS OVER", and "THE LAZY DOG" as first, second, third and fourth message portions via areas 104a-104d provided in the display screen 100. The server 56, and/or another computer in communication with the server 56, is configured with software executable to arrange each of the four message portions relative to a corresponding viewing axis. For example, as shown in FIG. 4, a virtual message portion 200 is visible on a real surface 204 such as a display of the user computer device 28, e.g., as shown in FIG. 3. The message portion 200 is configured to be optimally viewed for deciphering along an axis 208 extending approximately at an example viewing angle θ between a viewer's eye 212 and the message portion 200 when the message portion 200 is displayed as part of a cryptic note.

Each message portion of a virtual cryptic note is associated with a corresponding orientation that is rotated relative to orientations associated with the other message portions of the cryptic note. Thus, e.g., continuing the foregoing example and as shown in FIGS. 5A-5D, four message portions 300a-300d of the message "THE QUICK BROWN FOX JUMPS OVER THE LAZY DOG" are arranged in orientations 304a-

304*d* separated by 45 degrees. In the present example message, the directions of orientation for message portions 300*a*-300*d* are substantially the same as the directions in which the message portions 300*a*-300*d* are optimally deciphered by a viewer of a cryptic note that includes the message portions.

Also as shown in FIGS. 5A-5D, each message portion 300*a*-300*d* is altered to fit within a perimeter 308 having a shape and size selected by the user on the display screen 100 and within which the message is to be obscured. Such alteration may be performed based at least in part, e.g., on the font(s) selected by the user in the display screen 100. In various implementations, the server 56 refers to a text font file 68 for a font selected by the user. The server 56 obtains, from the appropriate text font file 68, shapes of letters, numbers and/or other characters 310 included in the relevant portion 300*a*-300*d*.

Characters of a given font may be customized in various ways in addition to being stretched and conformed, e.g., so that a cryptic note might be more easily decipherable. Software on or available to the server 56 may be executed to selectively kern (e.g., adjust the spacing between letters and/or characters) and selectively stretch (and/or squash) the character shapes to fit the characters 310 within the perimeter 308. For example, the letters "W" and "M" may be made slightly wider than other letters so that they may be more easily read in perspective. As another example, the letter "Q" in various fonts may be evaluated and customized so that the descender does not extend past the boundary of the surrounding shape when the "Q" is stretched.

It should be noted generally that at least some modification, i.e., manipulation, may be performed on characters of a given message portion in accordance with one or more algorithms that modify, or alternatively are independent of, kerning algorithms that might be provided in the associated text font file. Such algorithms may be provided in accordance with various implementations of the present disclosure, e.g., to account for details related to conforming characters to fit within a given shape, to improve legibility and aesthetics, to account for image size, print surfaces, materials, viewing distances, etc.

Figure 5A:
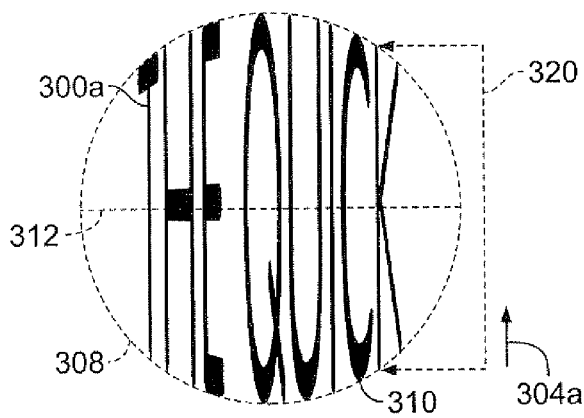
FIGS. 5A-5D are illustrations of message portions in accordance with one implementation of the disclosure.
Figure 5B:
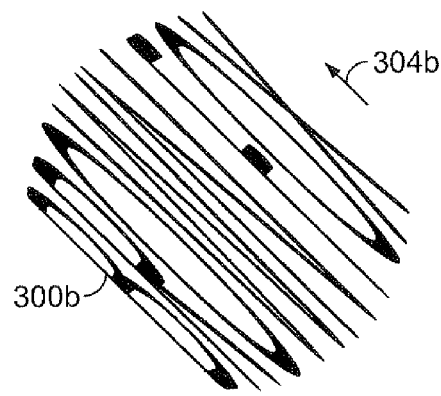
Figure 5C:
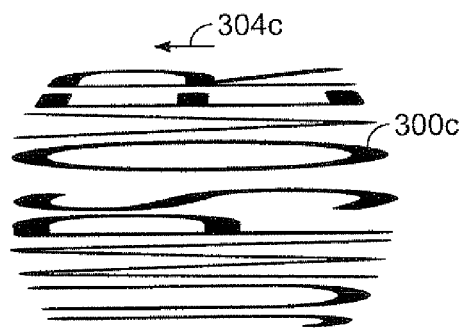
Figure 5D:
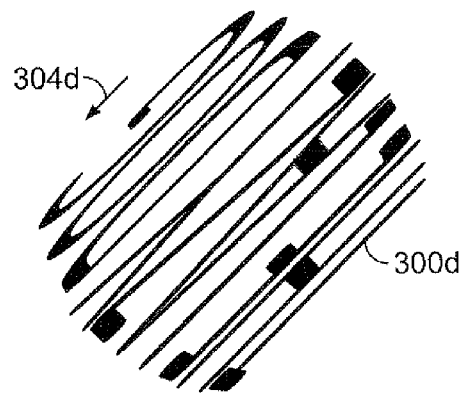

Referring again to FIGS. 5A-5D, characters 310 of a given message portion 300*a*-300*d* may be "squashed," e.g., compressed and/or stretched toward the perimeter 308 in a direction approximately perpendicular to the direction 304*a*-304*d* of orientation of the given message portion 300*a*-300*d*. Displaying may be performed, e.g., over about 78 percent of the diameter 312 of a circle defined by the perimeter 308. Characters 310 of a message portion 300*a*-300*d* also may be stretched along their orientation directions 304*a*-304*d*. Stretching is performed, e.g., based at least in part on sizes and locations of characters 310 within the message portion 300*a*-300*d* relative to the perimeter 308. Thus, for example, as shown in FIG. 5A, the "Q" in "QUICK" is stretched to a length substantially equal to the diameter 312, whereas the "K" is stretched to fit within an arc 320 inside the perimeter 308. Amounts of stretching and/or squashing can vary across a width and/or length of a given letter, character or image, particularly where a perimeter is curved. A message portion 300*a*-300*d* may be kerned, stretched, and/or otherwise manipulated individually, to account for different numbers, shapes and sizes of characters 310 in each message portion 300*a*-300*d*.

Figure 17A:
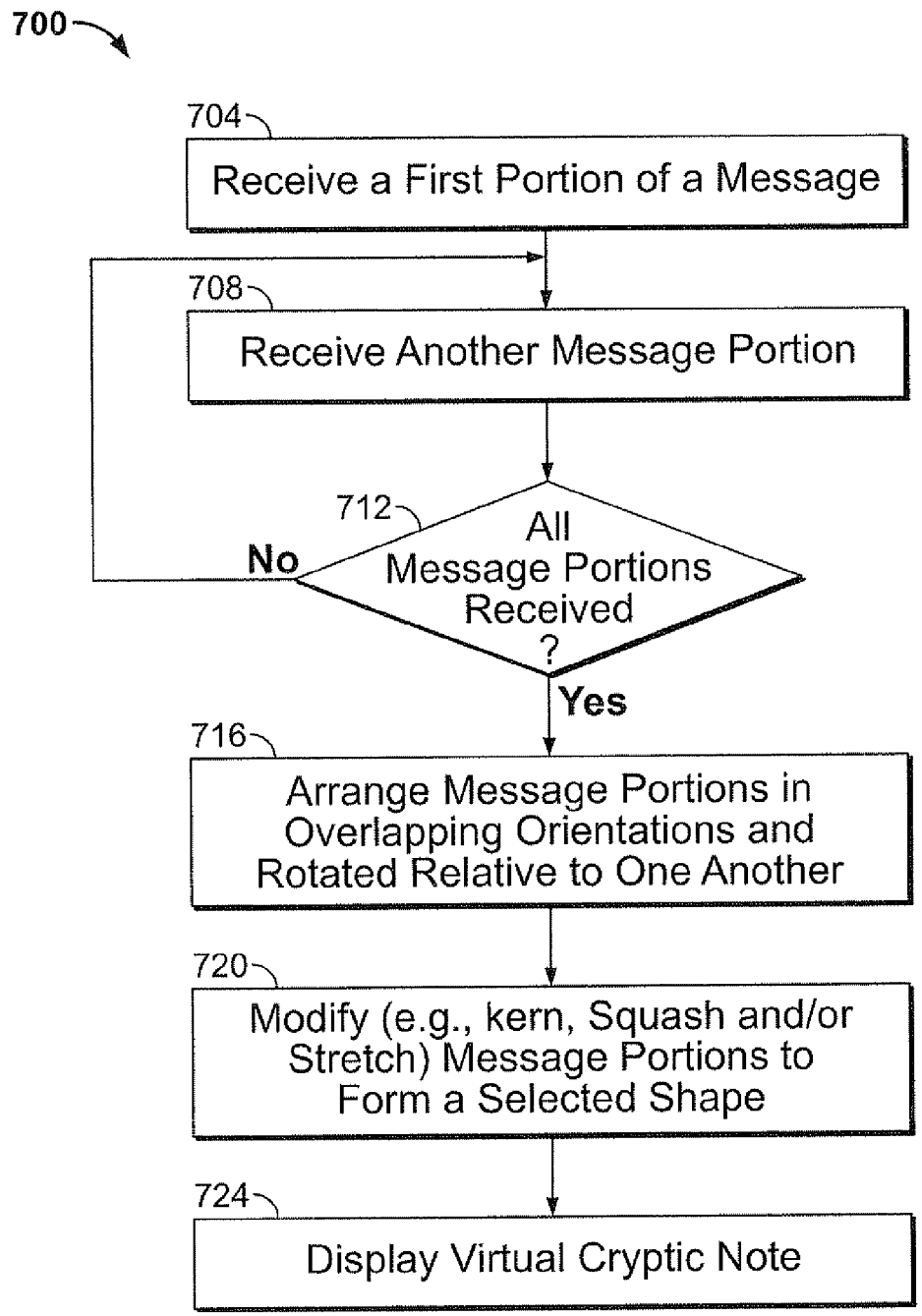
FIG. 17A is a conceptual flow diagram of a computer-implemented method of creating a virtual cryptic note in accordance with one implementation of the disclosure.

A conceptual flow diagram of one example computer-implemented method of creating a virtual cryptic note is indicated generally in FIG. 17A by reference number 700. In process 704, a first message portion is received from a user. In process 708, another message portion is received. In process 712 it is determined whether all message portions have been received from the user. If not, control returns to process 708. If it is determined that the user has completed entering the message portions, in process 716 the message portions are arranged in overlapping orientations and rotated relative to one another. In process 720 the message portions are manipulated, e.g., kerned, stretched and/or squashed, to form a shape selected by the user. The cryptic note may be displayed to the user in process 724.

It should be noted that although the method 700 is described in FIG. 17A as a sequential flow of processes, it is not so limited. Generally, the various processes disclosed herein are illustrative of aspects of the present disclosure and need not be characterized as such. For example, one or more of the various processes may be combined, or may be further subdivided into separate processes, modules, routines and/or subroutines. In addition, computer readable program code may comprise more processes, modules and/or components than those disclosed herein. Furthermore, computer readable program code for implementing one or more methods and/or processes disclosed herein may be a stand-alone application, a plug-in module, otherwise combined with an existing application and/or operating system, etc. Computer readable program code for implementing one or more methods and/or processes disclosed herein may be conventionally programmed using any of a wide range of suitable computer readable programming languages that are now known in the art or that may be developed in the future. Computer readable program code can include one or more functions, routines, sub-functions, and subroutines, and need not be combined in a single package but may instead be embodied in separate components. Computer readable program code may be integrated into an application or operating system. In yet another embodiment, the computer readable program code may reside at one or more network devices, such as an administrator terminal, a server, etc. Disclosure of the computer readable program code is not necessary, as one skilled in the programming arts should be able to generate such code without undue experimentation given the present disclosure. Accordingly, the details associated with the programming of the computer readable program code itself are not discussed in detail herein.

Figure 5E:
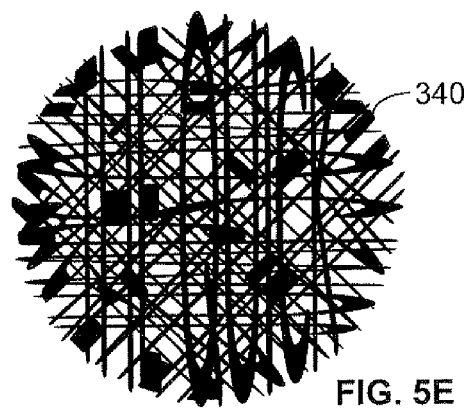
FIGS. 5E-5F are illustrations of cryptic notes in accordance with one implementation of the disclosure.

Referring again to the figures and as shown in FIG. 5E, the message portions 300*a*-300*d* are overlapped with one another to form a virtual cryptic note 340. To decipher the cryptic note 340, a viewer looks along viewing axes 208 corresponding to the message portions 300*a*-300*d*. The message portions 300*a*-300*d* thus may be deciphered sequentially as shown in FIGS. 6A-6D. After the viewer has deciphered one message portion 300*a*-300*d*, he/she may turn the cryptic note 340 to the next message portion orientation direction 304*a*-304*d* (in the present example, by turning the note by 45 degrees as indicated by dashed arrows 420*a*-420*d*,) to view the next message portion 300*a*-300*d*.

Figure 5F:
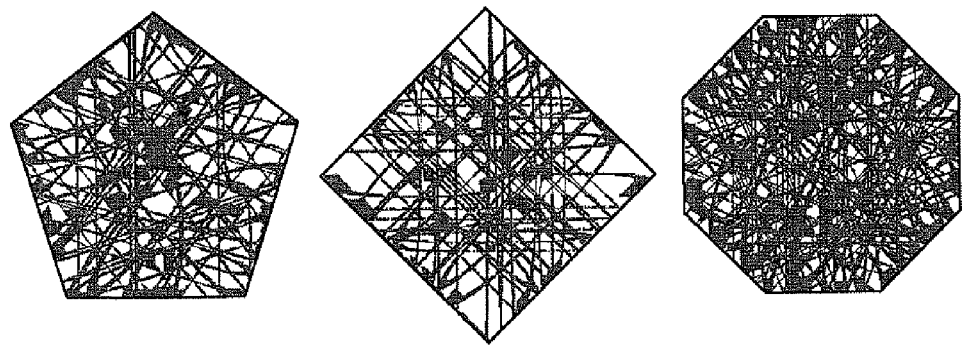
Figure 6A:
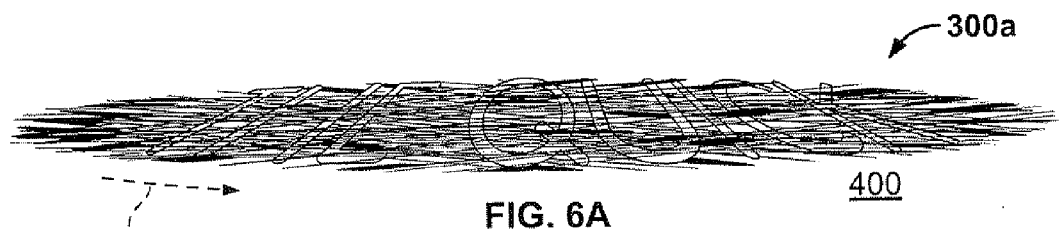
FIGS. 6A-6D are illustrations of message portions in accordance with one implementation of the disclosure.
Figure 6B:
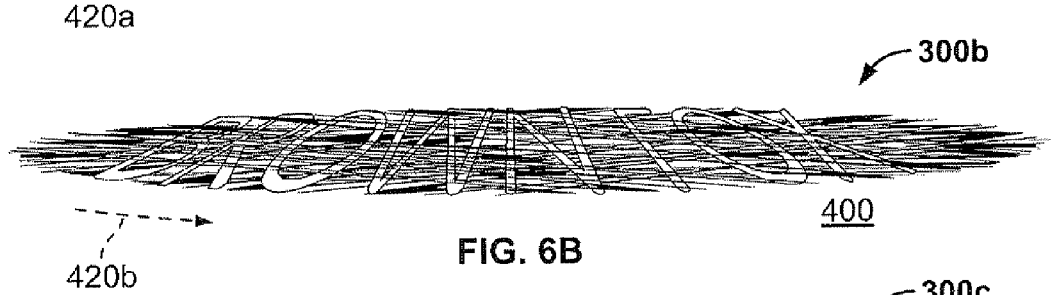
Figure 6C:
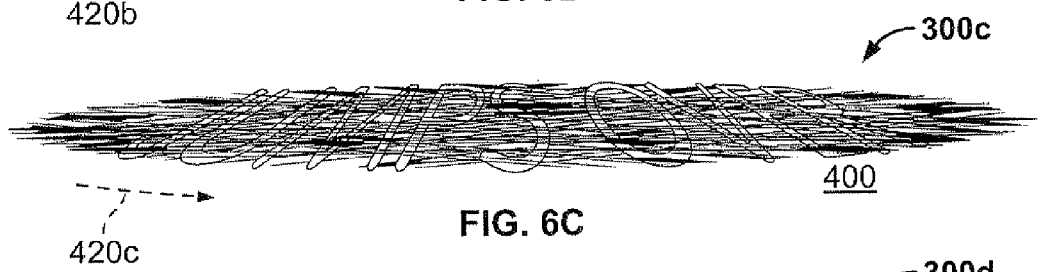
Figure 6D:
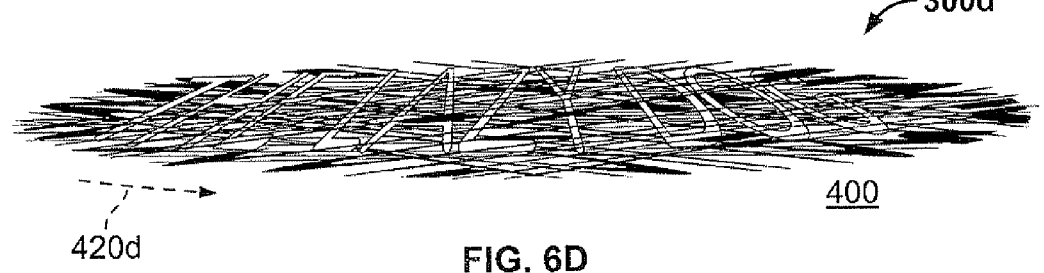
Figure 7A:
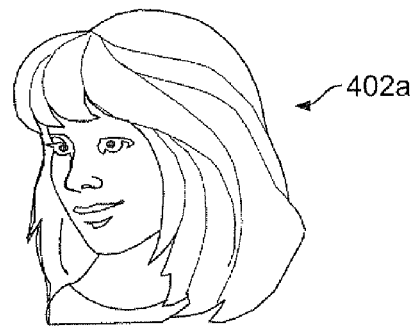
FIGS. 7A-7D are illustrations of message portions in accordance with one implementation of the disclosure.
Figure 7B:
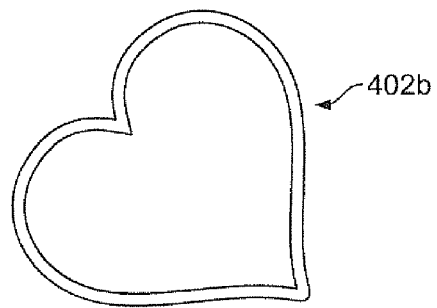
Figure 7C:
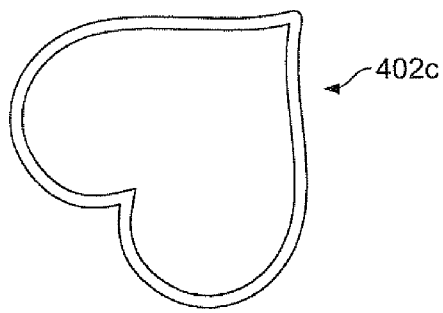
Figure 7D:
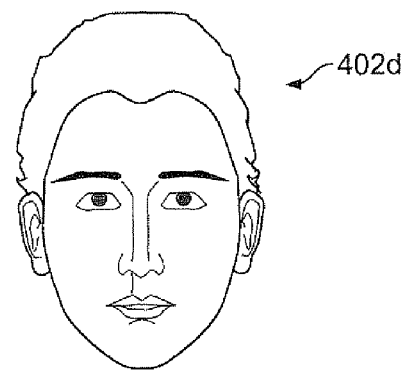
Figure 7E:
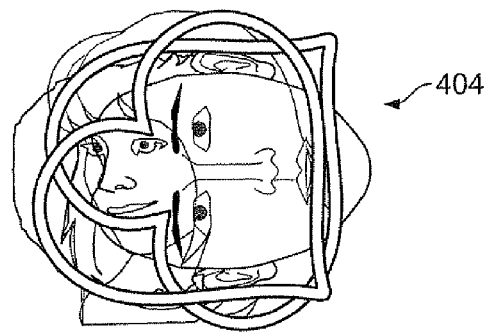
FIGS. 7E and 7F are illustrations of cryptic notes in accordance with one implementation of the disclosure.

As previously mentioned, cryptic notes may be generated in various shapes, e.g., as shown in FIG. 5F. Additionally or alternatively, a cryptic note may include one or more images. Such images may or may not include text. Such an image may, or may not, have one or more areas of at least partial transparency, such that when the image is used as or in a message portion of a cryptic note, the image reveals part(s) of one or more message portions over which the image is positioned in the note. In various embodiments, a user may selectively apply one or more levels of transparency to an image. FIGS. 7A-7D are illustrations of four message portions 402*a*-402*d*, each of which is an image. The message portions 402*a*-402*d* may be arranged in a cryptic note 404, e.g., as shown in FIG. 7E. In the present example, the message portions 402*a*-

402*d* are decipherable at a viewing angle of 90 degrees. In various implementations one or more images may be selectively stretched and/or squashed for inclusion in a cryptic message, and would be deciphered at a more acute viewing angle.

Figure 7F:
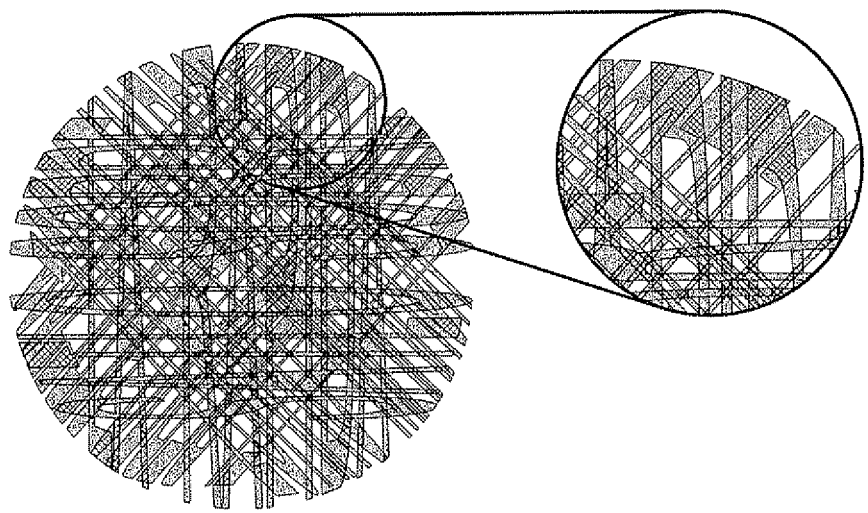

Additionally or alternatively, a user may selectively apply one or more levels of transparency to characters and/or images in a cryptic note, e.g., as shown in FIG. 7F. Various extents of transparency may be applied to different message portions of a cryptic note. Transparencies can be used to enhance legibility of cryptic notes, both in color(s) and/or black and white. When combined with various colors, shapes and patterns, the use of transparencies can result in color mixtures, overlapping shapes and patterns, etc. that can make a cryptic note more attractive and interesting to view. Overlaying colored, partially transparent shapes onto one another can create additional colors and color combinations in areas where one shape overlays another.

Figure 8A:
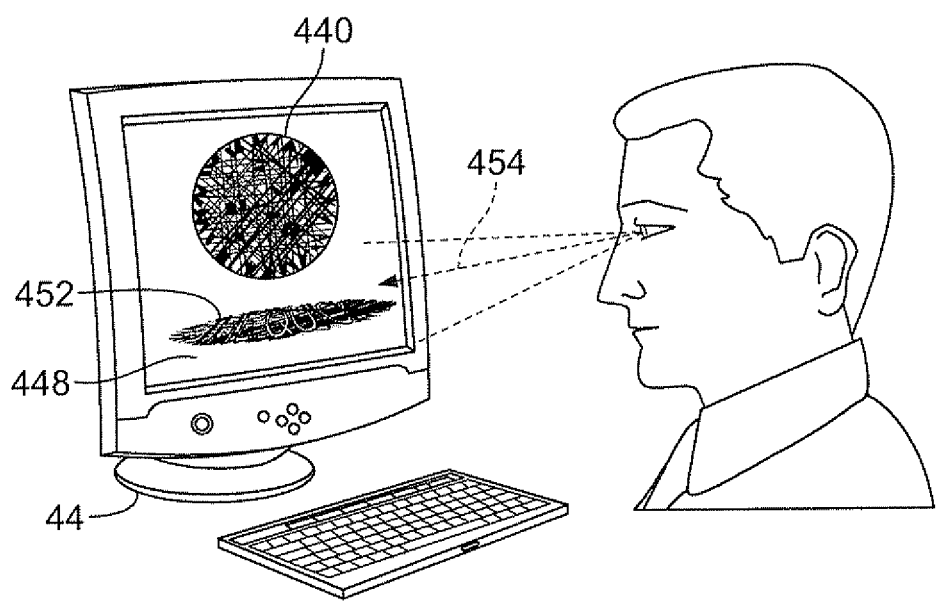

Viewing and deciphering of virtual cryptic notes may be accomplished in various ways depending, e.g., on a type of computer device on which the cryptic note is displayed. For example, as shown in FIG. 8A, a user may use a desktop computer 44 to virtually manipulate a virtual cryptic note 440 in order to decipher it. Accordingly the desktop computer 44 may graphically display the cryptic note 440 on one or more virtual surfaces 448. In the example embodiment shown in FIG. 8A, a rendering of a message portion 452 on the virtual surface 448 provides the user with a viewing axis 454 for deciphering the message portion 452. The user may selectively cause the desktop computer 44 to virtually move, e.g., virtually rotate, the virtual surface 448 to provide the user with another viewing axis for deciphering another message portion of the cryptic note 440. Additionally or alternatively, the desktop computer 44 may be configured to automatically manipulate the cryptic note 440 in accordance with a programmed display sequence, e.g., to provide a timed display of the cryptic note message portions, to provide an animated display of the cryptic note, and/or to provide other visual effects involving the cryptic note.

In some implementations, generation of a cryptic note may be displayed as an animated sequence. For example, after a user inputs a message portion in an area 104*a*-104*d* on the display 100, the server 56 may display movement of the message portion indicative of stretching, kerning and/or other manipulation of that message portion into a user-selected shape, e.g., as shown in FIGS. 5A-5D. When the user has finished inputting all of the message portions for a cryptic note, the server 56 may display movement of the message portions into their overlay positions to form a cryptic note, e.g., as shown in FIG. 5E. Movement of message portions and cryptic notes could be displayed in two and/or three dimensions and could be relative to one or more virtual surfaces. Such a sequence could be interesting and entertaining for users to view. Additionally or alternatively, cryptic notes, cryptic note shapes, message portions, and/or virtual surface(s) relative to which cryptic notes are displayed could be automatically manipulated and/or manipulated in accordance with user input, e.g., caused to undulate, stretch, shrink, wiggle, rotate, change color, shape, size, etc., and could provide interesting visual and audible effects. Such effects may include, e.g., graphics, illustrations, backgrounds, themes, animation, audio and/or music. In some implementations, the user may specify parameters to accompany a cryptic note for electronic sending to a recipient, by which the recipient's viewer software might reproduce such effects for the recipient when the recipient views the cryptic note.

As another example, as shown in FIG. 8B, a viewer may physically tilt and turn a mobile device, e.g., a mobile phone 52, in order to decipher a virtual cryptic note 460 displayed on a screen 464 of the mobile device. Additionally or alternatively, a mobile application may be provided to virtually manipulate, and/or to allow the user to virtually manipulate, the cryptic note 460 on the mobile device in the same or similar manner as previously described, e.g., with reference to FIG. 8A, i.e., without physically tilting or rotating the mobile device. It should be noted generally that one or more viewing angles (for example, the angle θ as shown in FIG. 4) could be provided by user selection and/or automatically, e.g., via the mobile application, dependent, e.g., on font, message shape, message portion structure, message and/or message size, display screen configuration, etc.

Figure 9:
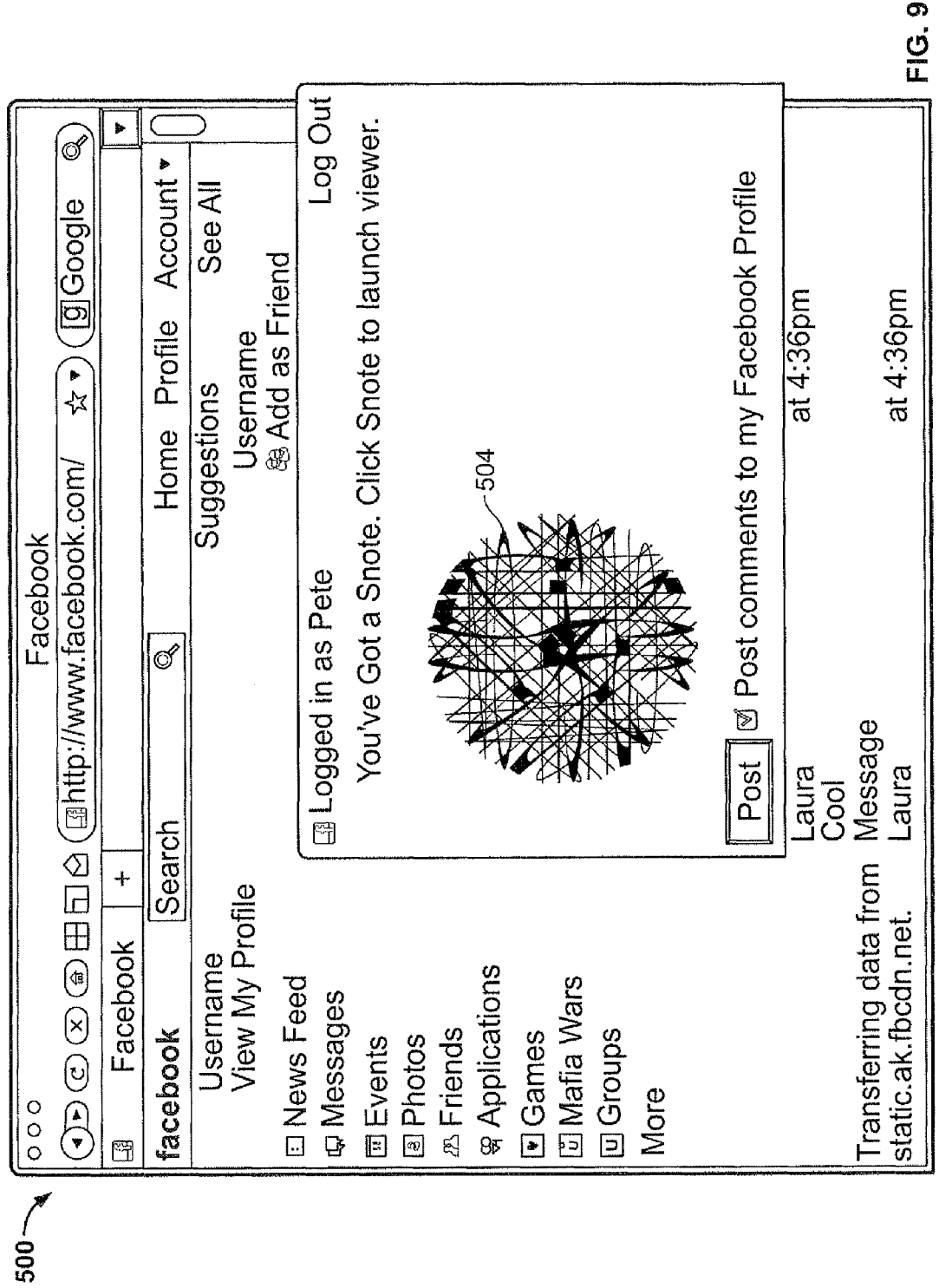
FIG. 9 is an exploded view of a user computer device screen displaying a Facebook® page in accordance with one implementation of the disclosure.
Figure 10:
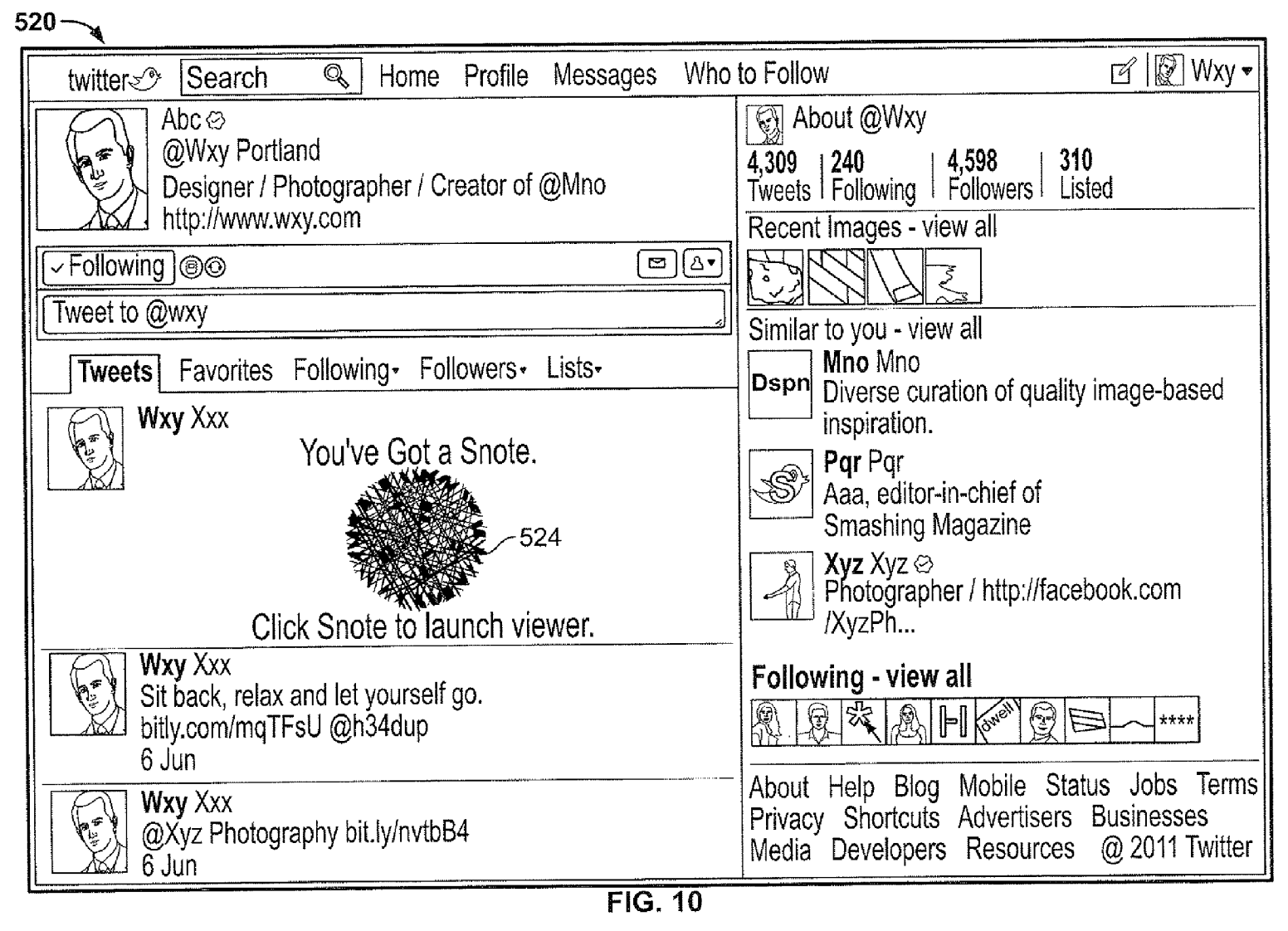
Figure 11:
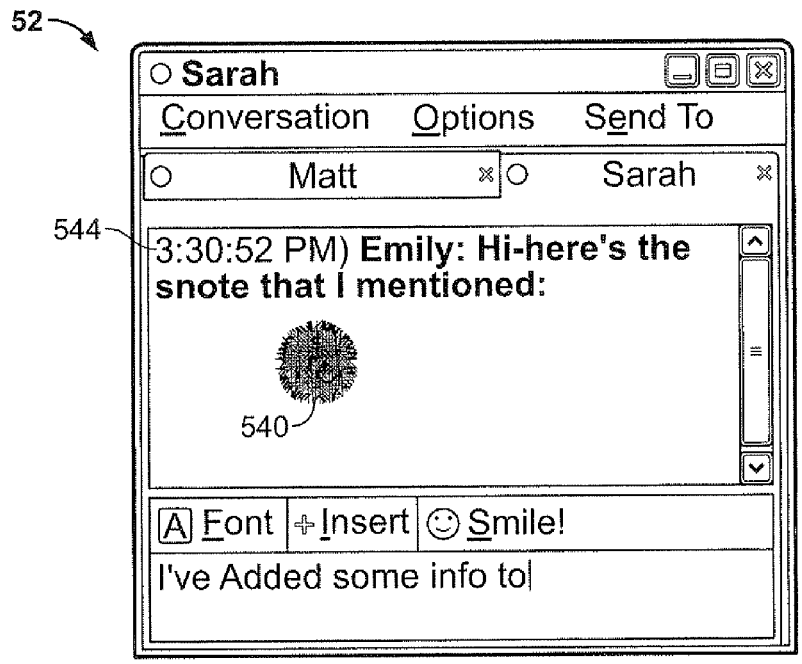
FIG. 11 is an illustration of a user computer device screen displaying a text message and attached cryptic note in accordance with one implementation of the disclosure.

Virtual cryptic notes can be both useful and entertaining when combined with social media. Users can compose various cryptic notes and send them to friends by email, Twitter®, Facebook®, Instagram™ and/or other social media. Smart phones can provide amusing games and other cryptic note applications that may be used alone or in groups, e.g., as shown in FIGS. 8C through 8F. As shown in FIG. 9, a Facebook® page 500 displays a virtual cryptic note 504. As shown in FIG. 10, a Twitter® display 520 includes a virtual cryptic note 524 sent as a Tweet. As shown in FIG. 11, a virtual cryptic note 540 is attached to a text message 544 sent to a mobile phone 52. Social media participants can use cryptic notes to communicate with one another, amuse one another, use cryptic notes in game play, e.g., by using them as questions, answers, clues, and/or messages in various types of online gaming.

Figure 13A:
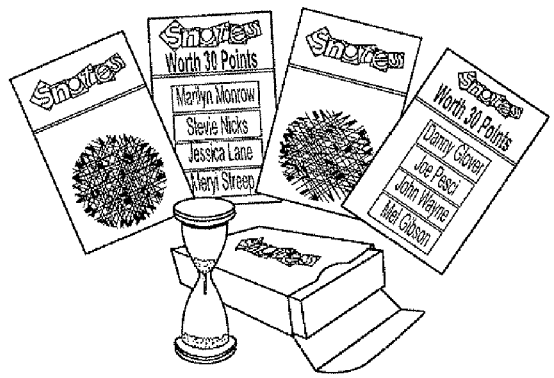
FIGS. 13A-13D are illustrations of devices relative to which a game may be played in accordance with one implementation of the disclosure.
Figure 13B:
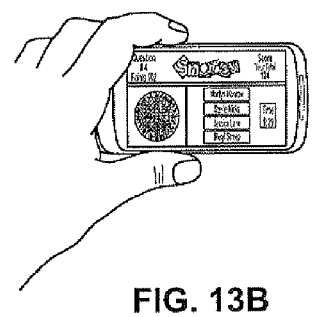
Figure 13C:
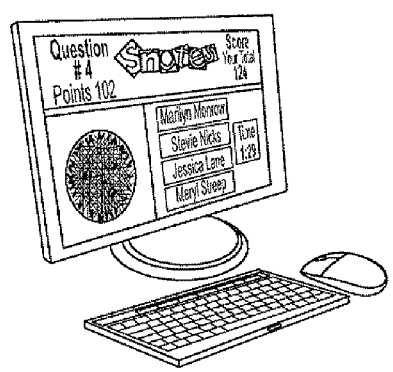
Figure 13D:
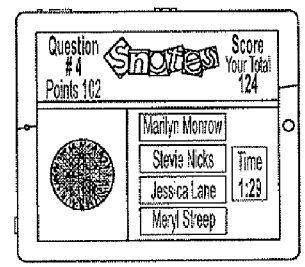
Figure 14A:
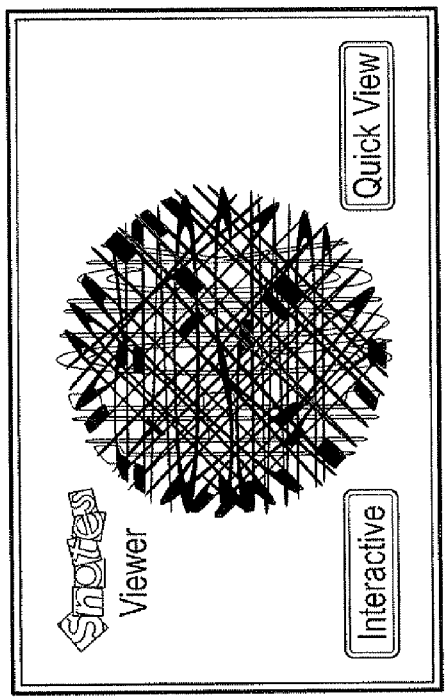
FIGS. 14A-14H are illustrations of user computer device screens displaying a cryptic note in an interactive mode in accordance with one implementation of the disclosure.
Figure 14B:
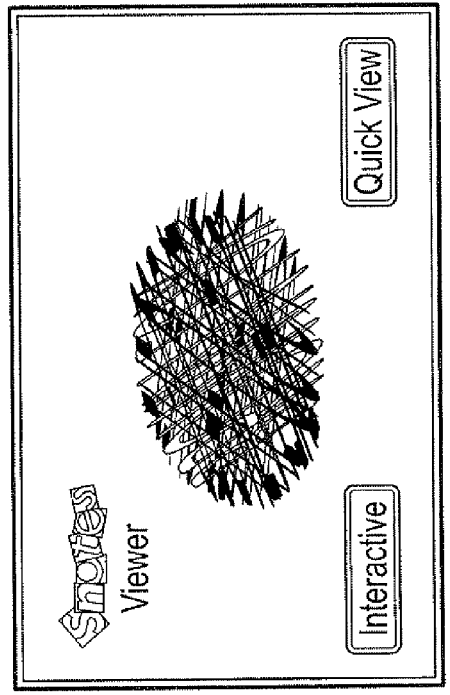
Figure 14C:
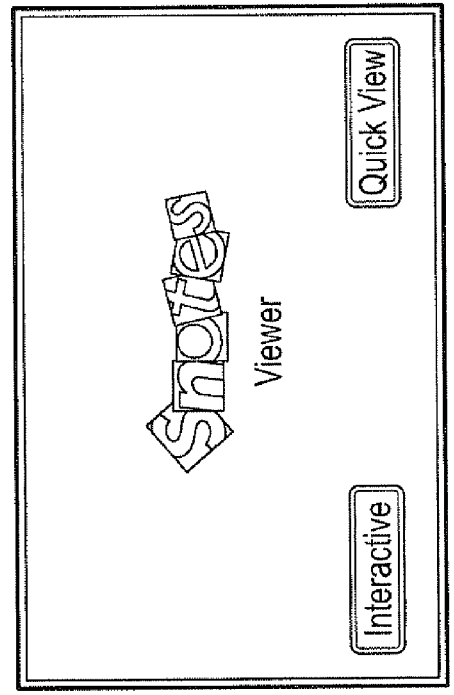
Figure 14D:
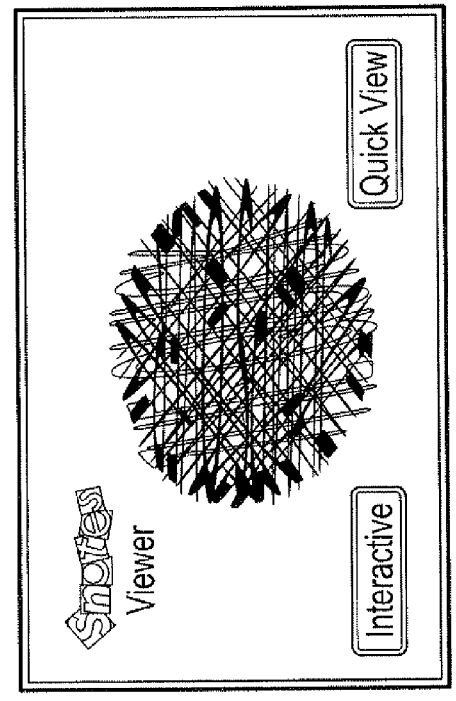
Figure 14E:
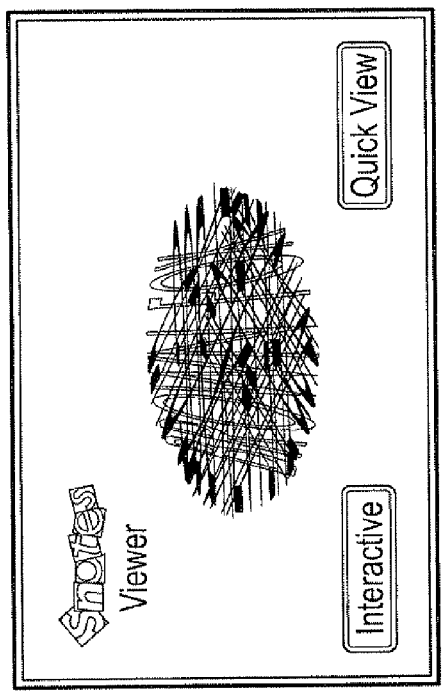
Figure 14F:
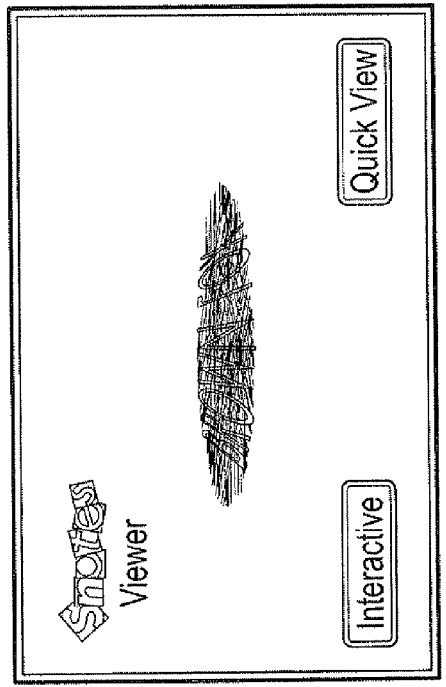
Figure 14G:
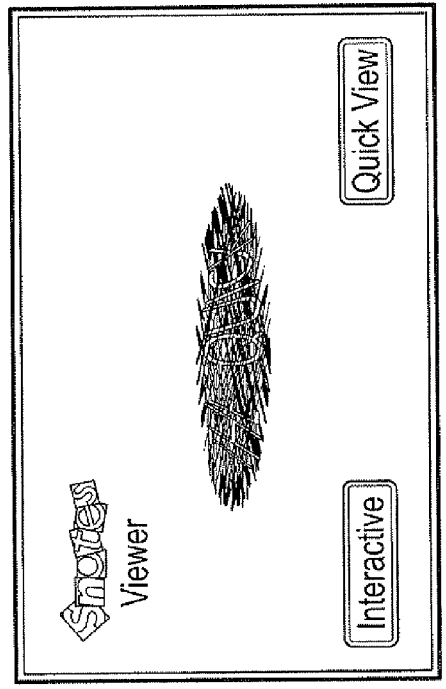
Figure 14H:
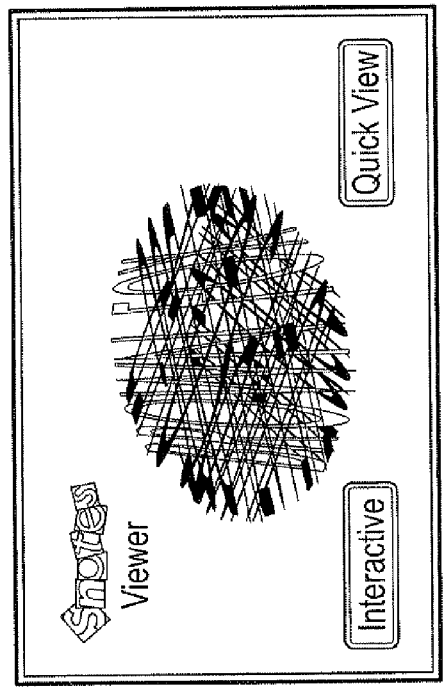
Figure 15A:
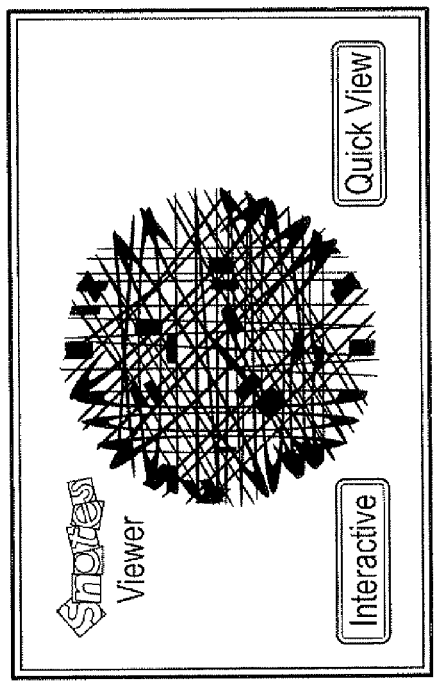
FIGS. 15A-15F are illustrations of user computer device screens displaying a cryptic note in a "quick view" mode in accordance with one implementation of the disclosure.
Figure 15C:
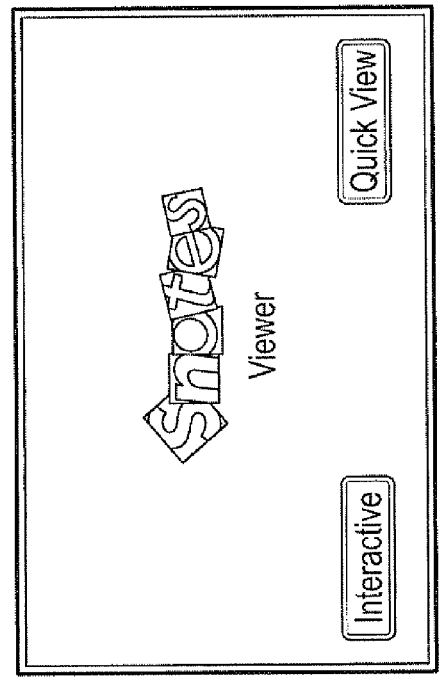
Figure 15B:
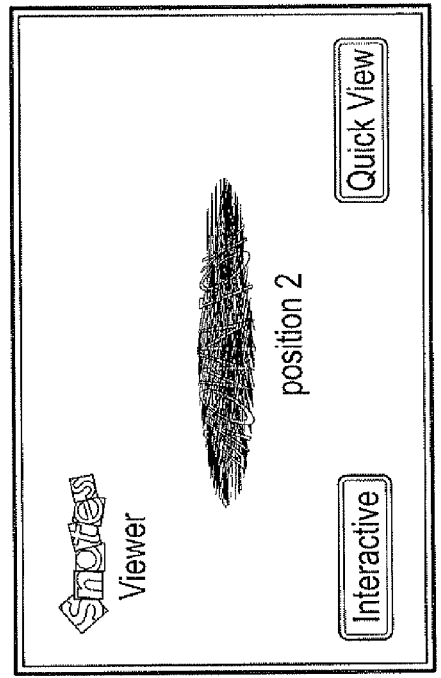
Figure 15D:
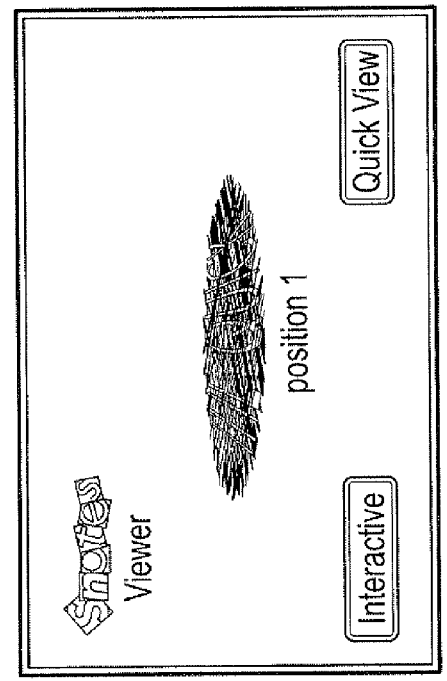
Figure 15E:
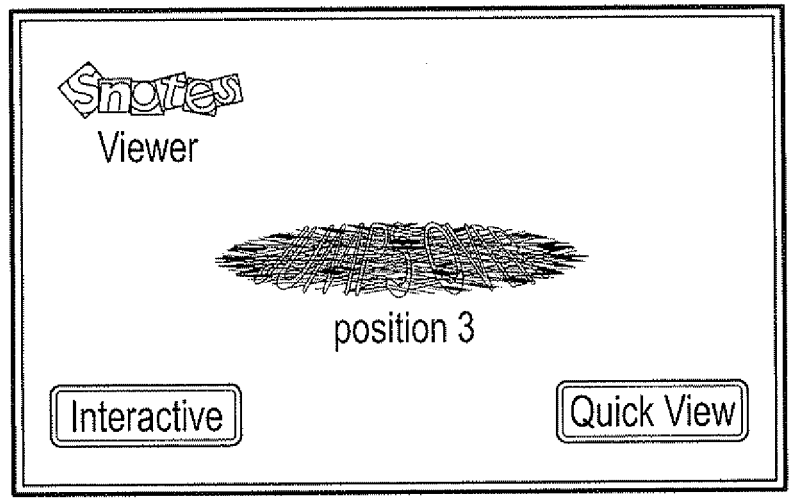
Figure 15F:
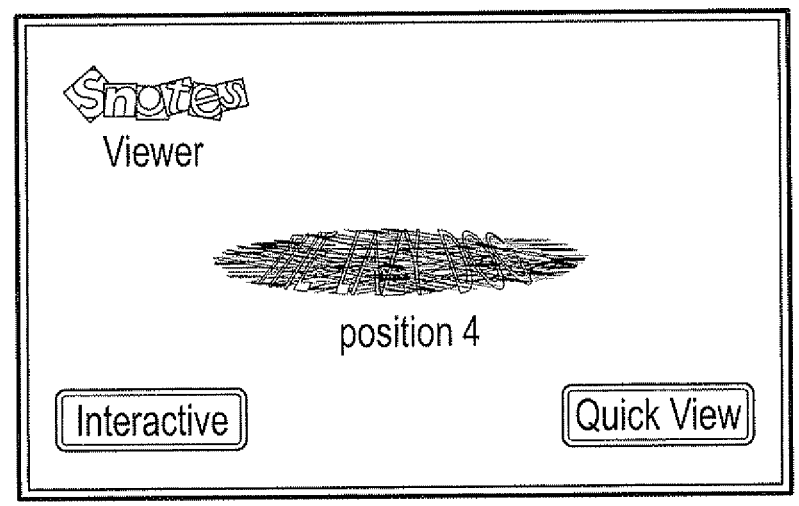

In one example embodiment, a game is provided that may be played by one or more players. Each player reads a cryptic note containing a quotation. The player then must identify, from a list of multiple choice answers, a person who was the source of the quotation. Player(s) may be scored, e.g., on whether they answer correctly and how much time it takes to answer. A person playing the game alone may play for points. Various ways of playing the game are illustrated in FIGS. 13A-13D. The game may be played, e.g., as a card game as shown in FIG. 13A, digitally as shown in FIGS. 13B-13D, and/or, e.g., as a board game. It should be noted generally that many different types of games may be played using cryptic notes, and that the foregoing game is only one example.

In some implementations and as previously discussed with reference to FIG. 8A, viewer software may be provided on, and/or may be accessible to, a user computer device 28, whereby a user who has received a cryptic note may decipher the cryptic note. A user may, e.g., receive an email or text message in which a cryptic note is displayed. Where the user's computer device 28 includes or has access to viewer software, the user may invoke the viewer software to manipulate the cryptic note so that the user may conveniently decipher it. For example, a user who receives the cryptic note 504 (shown in FIG. 9) and/or a user who receives the cryptic note 524 (shown in FIG. 10) may "click" on the cryptic note to launch such viewer software.

In one embodiment shown in FIGS. 14A-14H, the user may, e.g., invoke such viewer software in an interactive mode, to virtually rotate and graphically display the cryptic note on a display screen of the computer device 28. When the viewer software is executing in the interactive mode, the user may, for example, move a computer mouse or activate a touch screen relative to the displayed cryptic note to cause the viewer software to move, e.g., tilt and/or rotate, the cryptic note in accordance with, e.g., the mouse movement or touch screen activation. Alternatively or additionally, various devices may be used to manipulate a cryptic note in the interactive mode. For example, a touch pad, stylus, arrow keys, voice commands, etc., may be used. In some embodiments, message portions of a cryptic note could be displayed on one or more virtual surfaces, e.g., as discussed with reference to FIG. 8A, thereby providing one or more appropriate viewing axes along which to decipher the message portions. In some embodiments, a user computer device 28 may receive a virtual cryptic note accompanied by viewer software configured to provide the recipient of the note with viewing parameters and effects specific to the note and/or its message contents.

A user, however, may wish to decipher the message portions of a cryptic note in a predetermined ordered sequence, e.g., in an order in which the message portions combine to provide a complete message in the cryptic note. Accordingly, in various embodiments, viewer software may be executed in a "quick view" mode, e.g., as shown in FIGS. 15A-15F, to rotate a cryptic note on a virtual surface, beginning at an orientation direction corresponding to the first message portion of the note. The user may enter prompts, e.g., via a user interface of the computer device 28, e.g., to cause the cryptic note to be rotated to the next orientation direction in the ordered sequence, and so on, until the user has had an opportunity to view all of the message portions in their predetermined order.

Figure 17B:
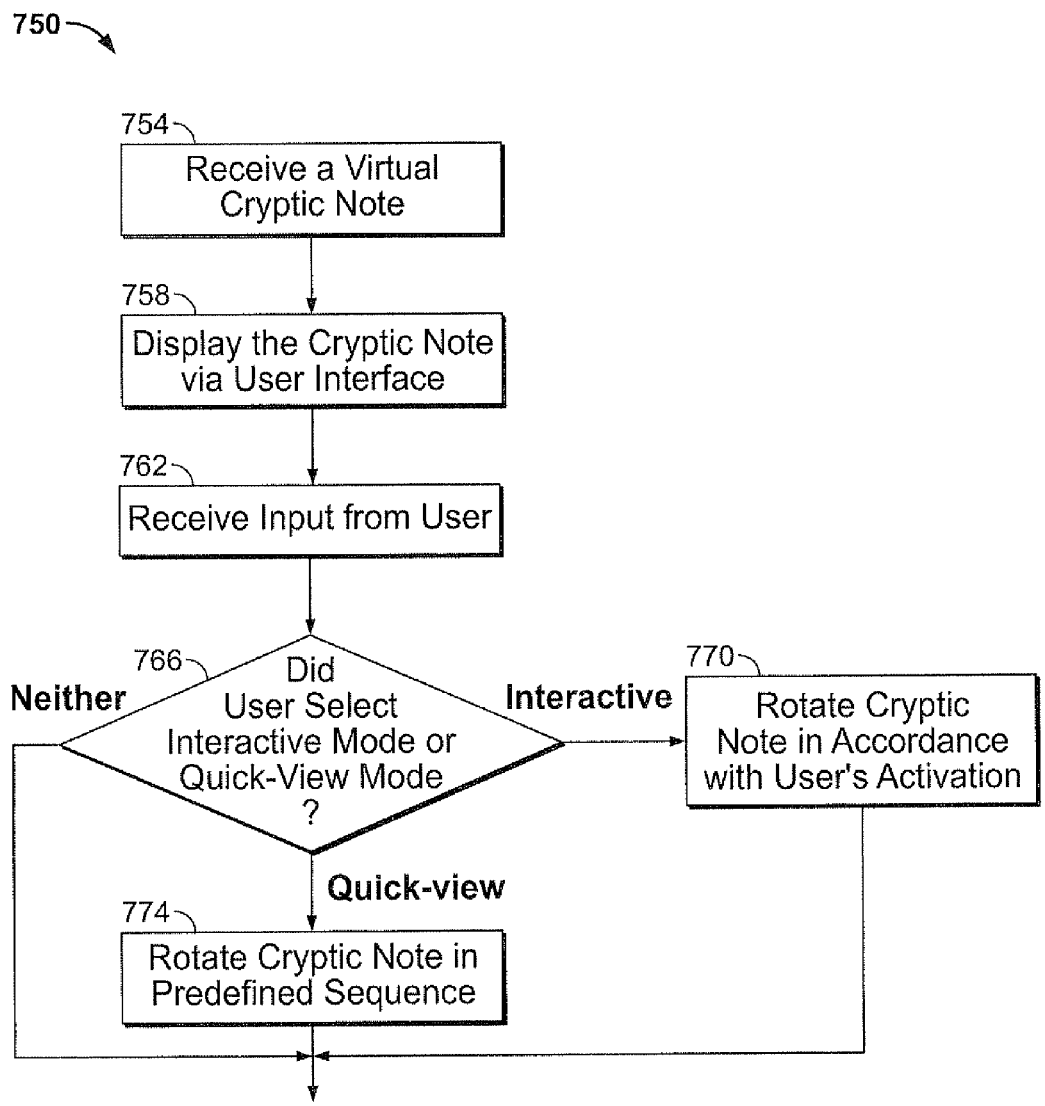
FIG. 17B is a conceptual flow diagram of a computer-implemented method of providing viewing of a virtual cryptic note in accordance with one implementation of the disclosure.

A conceptual flow diagram of one example computer-implemented method of providing viewing of a virtual cryptic note is indicated generally in FIG. 17B by reference number 750. In process 754, a computer device receives a virtual cryptic note, e.g., from another device. In process 758, the recipient computer device displays the cryptic note. In process 762, an input is received from the user of the computer device. In process 766 it is determined whether the user has selected an interactive or quick-view mode for viewing the cryptic note. If neither mode was selected, then the computer device proceeds to perform some other action requested by the user (which could be, e.g., to save the cryptic note for future viewing.) If it is determined that the user has selected an interactive mode, in process 770 the cryptic note is rotated in accordance with the user's activation, e.g., of a mouse or other input device as described above. If the user has selected a quick-view mode, in process 774 the cryptic note is rotated in accordance with a predefined sequence, e.g., as described above.

Additionally or alternatively, viewer software may be executed to rotate a cryptic note automatically in accordance with a defined time sequence. In some implementations a user could interactively use viewer software in various ways to achieve various amusing effects. For example, viewer software could be configured to display a "deconstruction" of a cryptic note, e.g., by showing movement of the cryptic note message portions out of their overlay positions to form a linear sequence, and/or by reversing the manipulations (e.g., kerning, squashing and/or stretching) of the message portions.

It should be noted generally that for a user, viewing a cryptic note can provide an experience quite different from that of creating a cryptic note. Viewer software may, e.g., provide for user-controlled and/or automatic controlled manipulation of animated sequences and/or special effects in which cryptic notes, cryptic note shapes, message portions, and/or virtual surface(s) relative to which cryptic notes are displayed may be, e.g., caused to undulate, stretch, shrink, wiggle, rotate, change color, shape, size, etc. Such effects may include, e.g., graphics, illustrations, backgrounds, themes, animation, audio and/or music. Such effects may or may not include the cryptic messages themselves and/or their backgrounds and/or accompanying graphics.

In various embodiments, methods of generating and/or viewing cryptic notes may be written, e.g., in C#, Adobe® ActionScript®, PHP, Microsoft® .NET and may, e.g., use Adobe® Flash® Platform. Applications for mobile devices may be written, e.g., in C#, PHP, and Microsoft® .NET. The foregoing software languages and/or products are not exclusive, however, and other or additional software languages and/or products could be used in various implementations. It should be noted that in some embodiments, a computer device may be configured to generate any and all variations of cryptic notes as described herein. Additionally or alternatively, in some embodiments a computer device may be configured to provide viewing of any and all variations of cryptic notes as described herein.

Figure 16A:
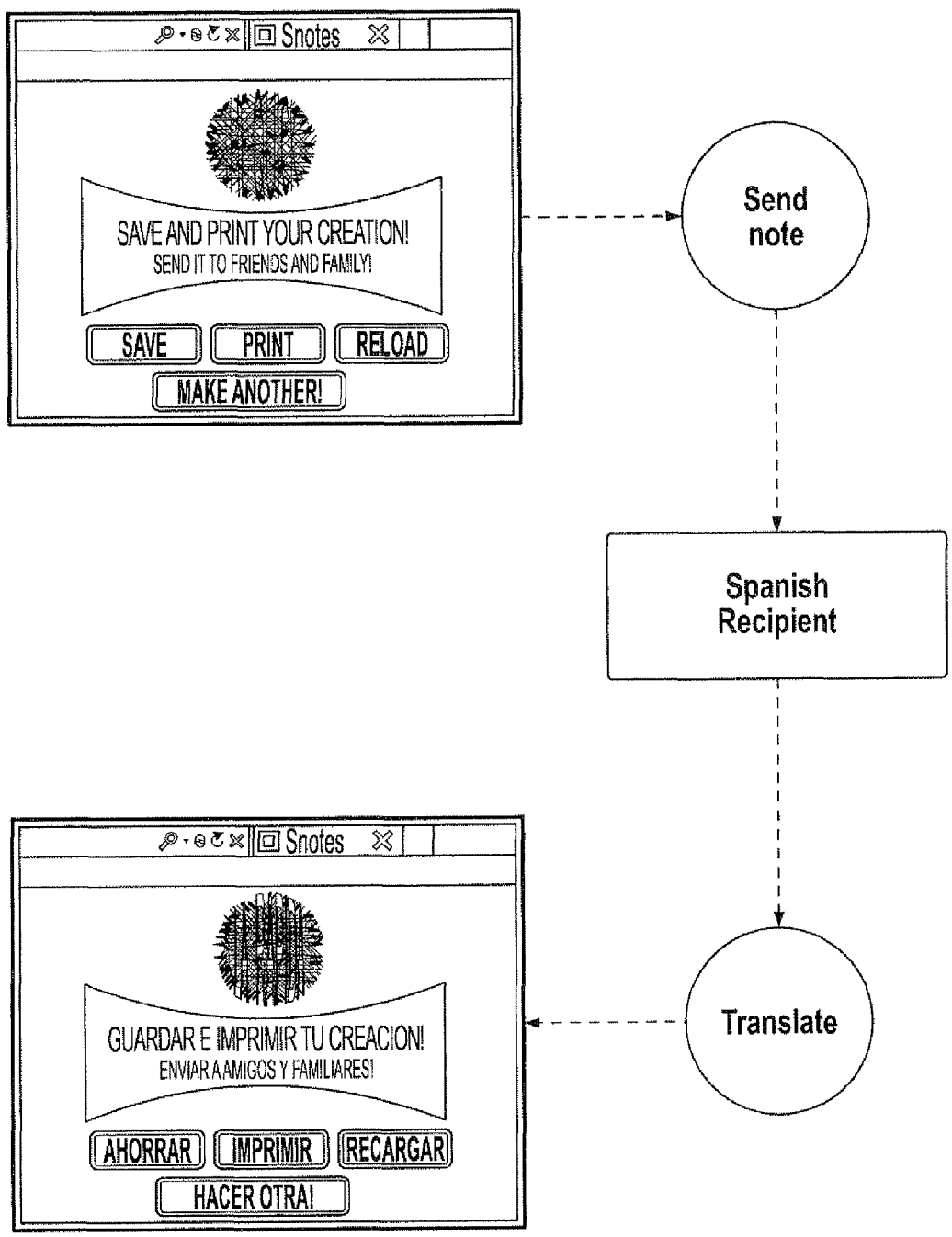
FIG. 16A is a conceptual diagram of a method of providing a cryptic note in a second language in accordance with one implementation of the disclosure.
Figure 16B:
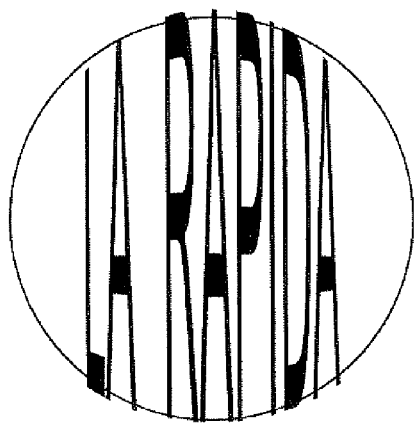
FIGS. 16B-16E are illustrations of message portions in a second language in accordance with one implementation of the disclosure.
Figure 16C:
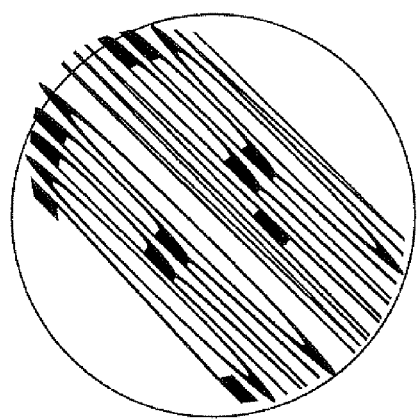
Figure 16D:
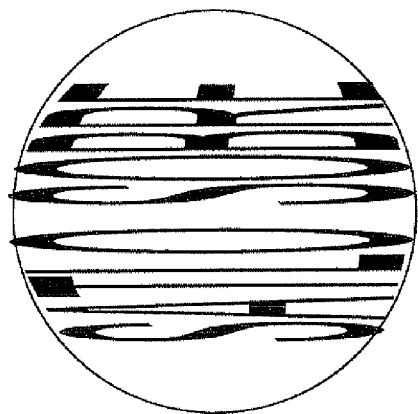
Figure 16E:
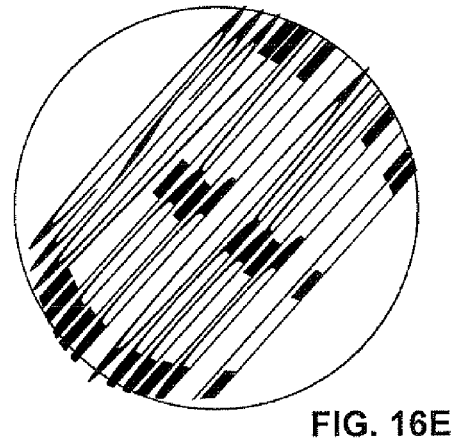
Figure 16F:
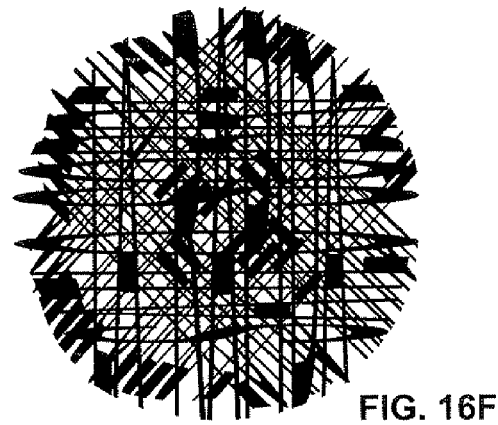
FIG. 16F is an illustration of a cryptic note in a second language in accordance with one implementation of the disclosure.
Figure 16G:
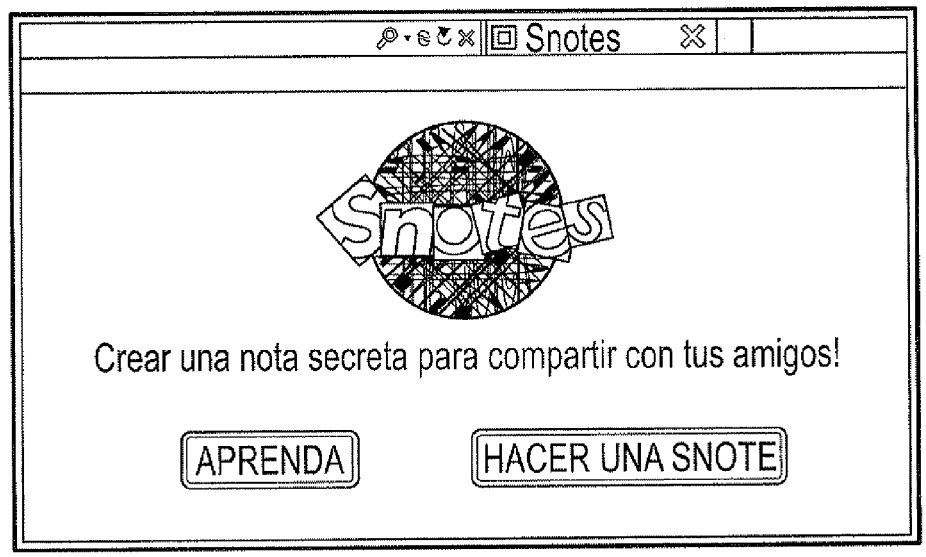
FIGS. 16G-16N are illustrations of display screens used to create a cryptic note in a second language in accordance with one implementation of the disclosure.
Figure 16H:
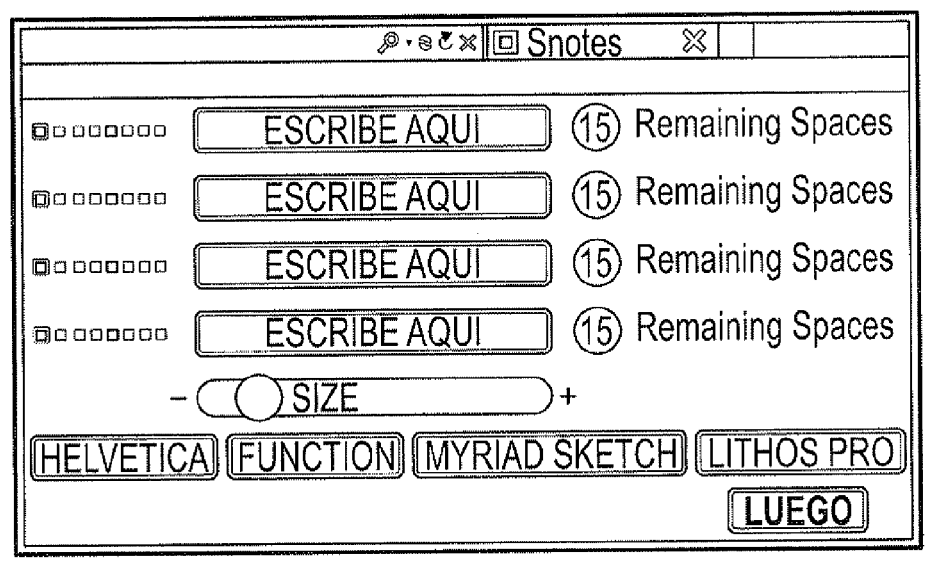
Figure 16I:
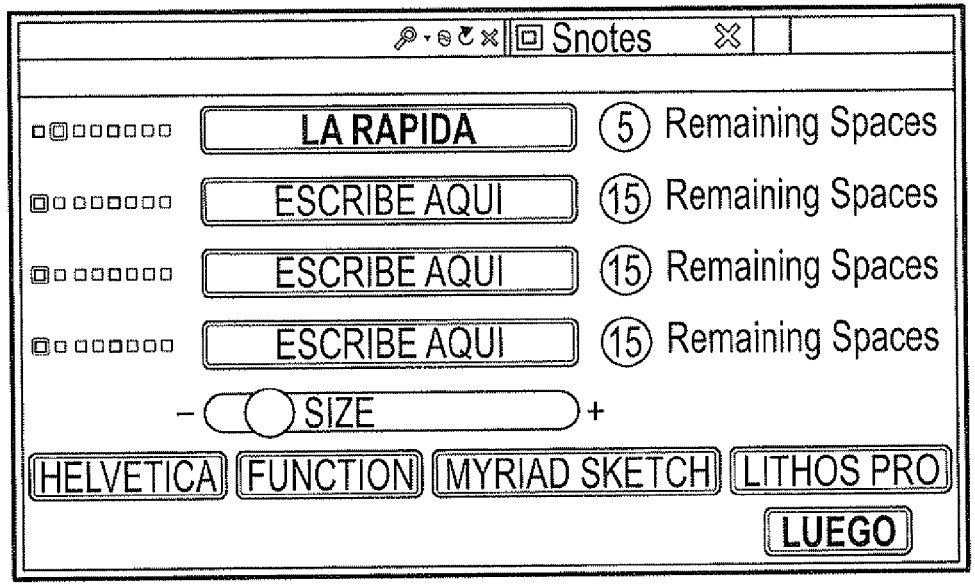
Figure 16J:
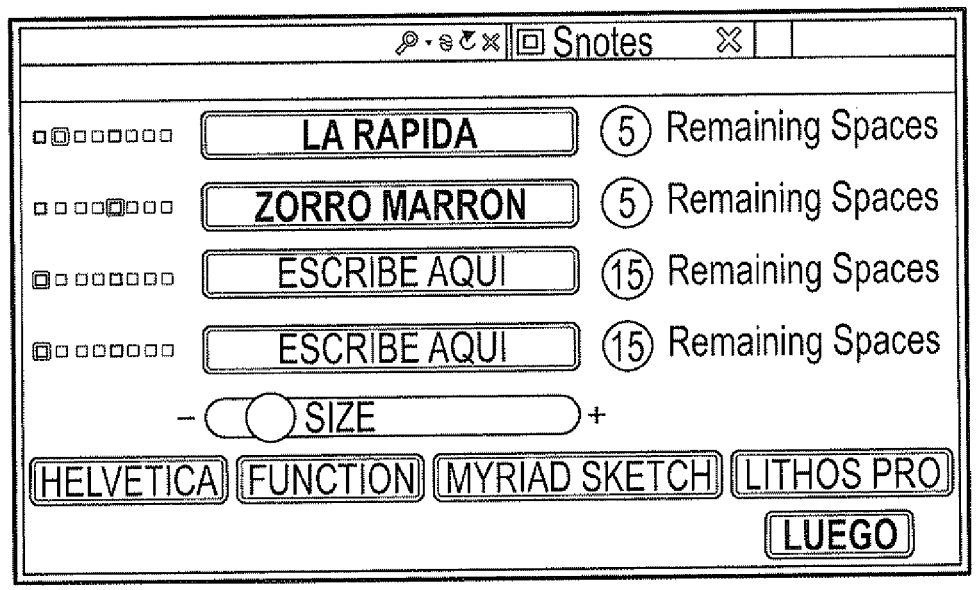
Figure 16K:
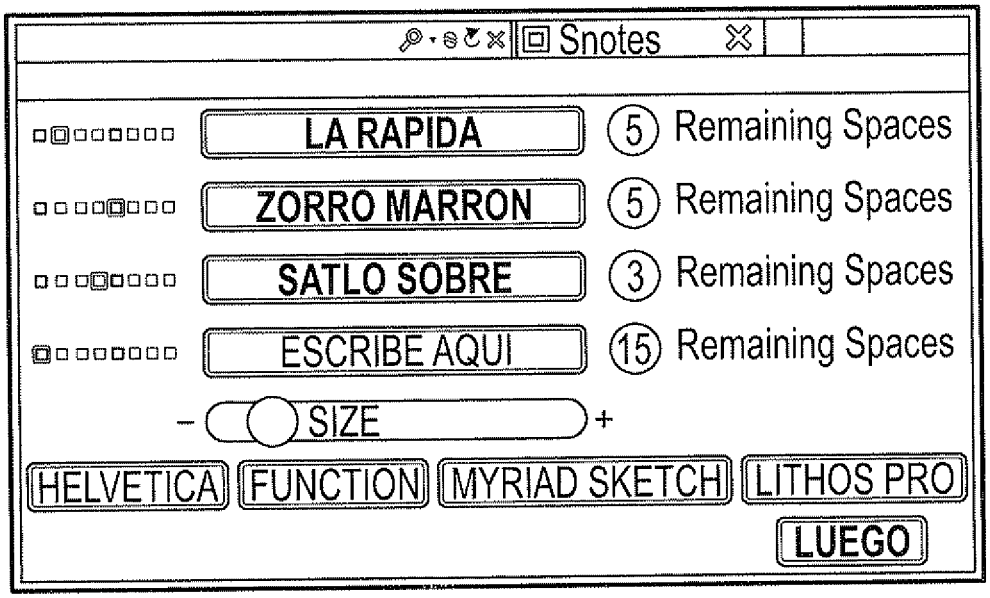
Figure 16L:
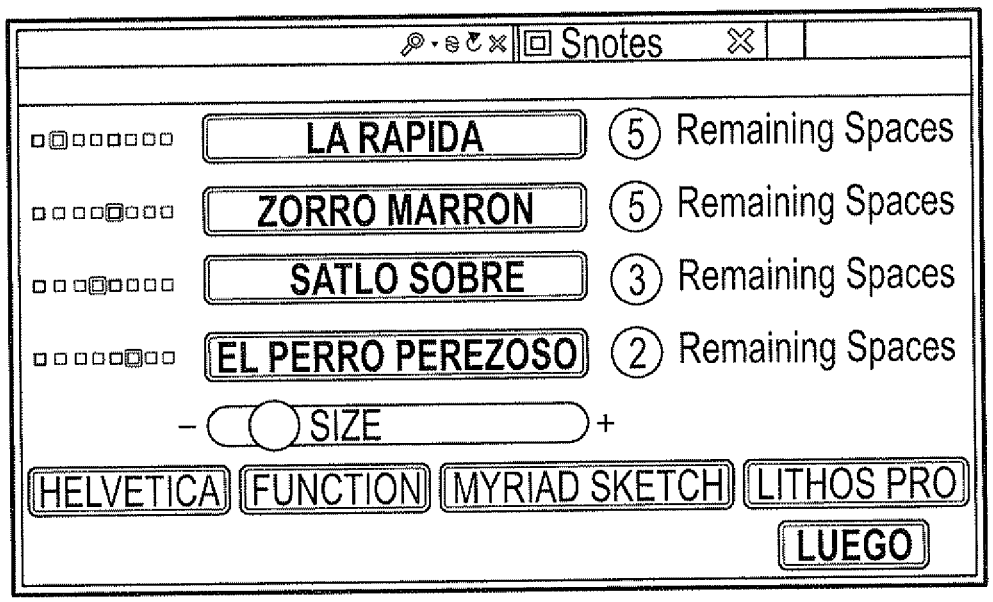
Figure 16M:
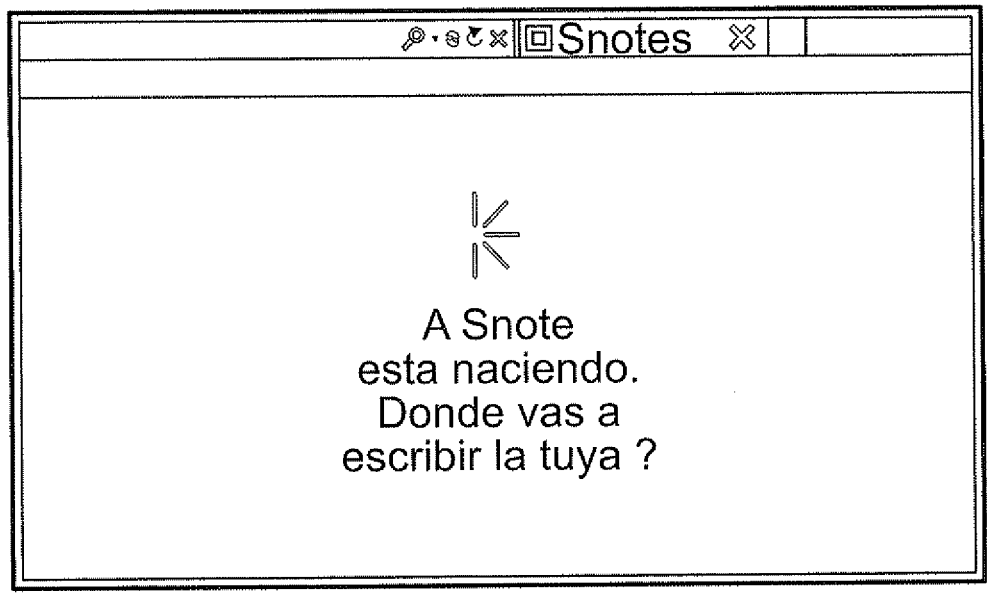
Figure 16N:

It should be noted that cryptic notes may be created and viewed in a plurality of languages. In various embodiments, virtual cryptic notes may be created in a first language and sent to a recipient, who translates the note into a second language so that it can be read in the second language. One example method of providing a cryptic note in a second language is shown in FIG. 16A. In some embodiments, the recipient may use an automated translation capability, e.g., Google Translate™, Microsoft® Translator, etc., to translate a virtual cryptic note into the second language. The translated message may subsequently be subdivided into message portions, which may be stretched, conformed and customized, as previously discussed above, to provide the virtual cryptic note in the second language. In some other embodiments, each message portion received in the first language may be translated into the second language, and the translated message portions subsequently may be stretched, conformed and customized to provide the virtual cryptic note in the second language, as previously discussed. Message portions for a cryptic note in Spanish are shown in FIGS. 16B-16E. The resulting cryptic note is shown in FIG. 16F. FIGS. 16G-16N illustrate display screens used in creating a cryptic note in Spanish, which then could be sent to a recipient and translated into another language in the same or similar manner as discussed above.

In some aspects, virtual cryptic notes may be used as verification codes for computing applications. For example, a cryptic note may be displayed on a website in order to prevent automated access to features of the website. Message portions of the cryptic note may be displayed as previously described, to allow a person viewing the website to conveniently decipher the note. That person would decipher the cryptic note and send the message in the note to the website in order to be granted access to website features. Additionally or alternatively, in various aspects a cryptic note may be displayed, for example, on the face of a programmable watch, as a screen saver that moves and/or twists, in three or more dimensional levels, e.g., for messaging and/or online games, etc. Cryptic notes may also be created digitally, e.g., to produce e-cards and custom cards online.

It should be noted that cryptic notes are not necessarily restricted to computer display, but could be displayed on articles of manufacture and/or other three dimensional objects. In some implementations, a virtual cryptic note may be used to obtain a real cryptic note embodied on an article of manufacture or other three-dimensional object. For example, a user may input message portions on the display screen 100 to obtain a virtual cryptic note. The user may then instruct the server 56 to transmit the note to a third person, e.g., a manufacturer, for conversion into a real cryptic note on an article of manufacture. In some aspects of the disclosure, such a real cryptic note may be applied manually to an article of manufacture.

Figure 12A:
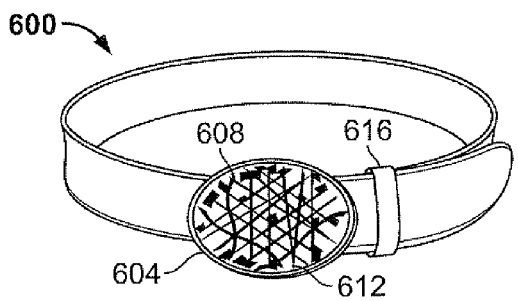
FIGS. 12A-12F are illustrations of three-dimensional objects including cryptic notes in accordance with one implementation of the disclosure.

An example three-dimensional object embodying a cryptic note is indicated generally in FIG. 12A by reference number 600. The object 600 is a belt having a buckle 604 that includes a message having at least a first message portion 608 and a second message portion 612 lying in substantially the same plane of the buckle 604. The first message portion 608 includes the name "STEVE" and is arranged vertically as shown in FIG. 12A. The second message portion 612 also includes the name "STEVE" and is arranged horizontally as shown in FIG. 12A. Further, the buckle 604 has a total of four message portions, each of which includes the name "STEVE." The first message portion 608 is substantially decipherable when the buckle 604 is oriented at a first viewing angle relative to a user, e.g., where a user looks upwardly onto the buckle 604 from below the buckle 604. The second message portion 612 is substantially decipherable when the buckle 604 is oriented at a second viewing angle relative to the user, e.g., where the user looks onto the buckle 604 from the side of the belt on which a belt loop 616 is provided.

Figure 12B:
Figure 12C:
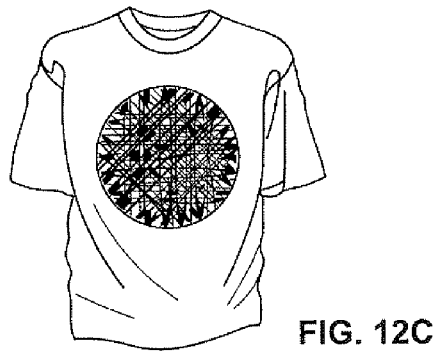
Figure 12D:
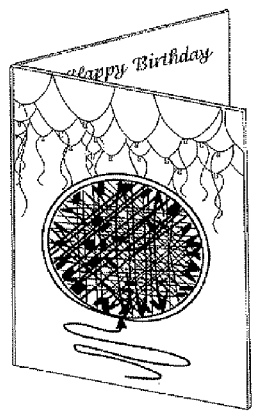
Figure 12E:
Figure 12F:
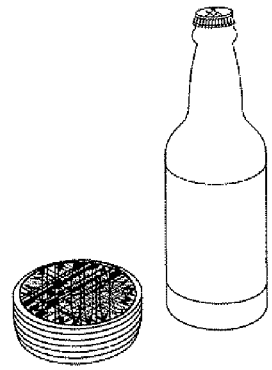

Many different three-dimensional objects (i.e., objects that do not have a negligible thickness) could be provided with cryptic notes, including but by no means limited to snowflake ornaments and other types of ornaments, e.g., as shown in FIG. 12B, garments and wearable items, e.g., as shown in FIG. 12C, greeting cards, e.g., as shown in FIG. 12D, earrings and other jewelry, e.g., a pendant as shown in FIG. 12E, and coasters, e.g., as shown in FIG. 12F. Other or additional objects that can have cryptic notes include candy and other edibles (including but not limited to fortune cookies, cake decorations, Valentine candy hearts,) mugs, cups, glasses, plates, games (including but not limited to board games and card games,) puzzles, promotional items, advertising attachments, seasonal mementos, flash cards, key chains and key rings, gift tags, identification placards for bikes and other items, lunch boxes, paperweights, magnets, wall decorations, gifts, toys, stuffed animal tags that include names and/or messages, ring boxes or cases on which a cryptic note is provided that says "marry me", identifiers for smart phone cases, temporary and/or permanent tattoos, etc. In some embodiments, a book may be made from cryptic notes. Cryptic notes may also be used as product codes. For example, a product may be identified, e.g., uniquely identified, by a cryptic note containing a serial number and/or model number, similar to a QR (quick response) code.

Cryptic notes could be provided on various surfaces. Cryptic notes could also be provided beneath but remain visible through various surfaces, e.g., where provided under clear plastic, varnish, or glass on various objects. Cryptic notes can be decorative as well as meaningful. Since many cryptic notes may have a center generally about which message portions are angularly distributed, the notes often exhibit a symmetry that can be attractive to the eye.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another element, component, region, layer or section. Terms such as "first," "second," and other numerical terms when used herein do not imply a sequence or order unless clearly indicated by the context. Thus, a first element, component, region, layer or section discussed herein could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A computer-implemented method comprising:
   receiving a message from a user via a user interface of a computer device, the message including at least a first portion and a second portion, each portion of the message including letters and/or numbers;
   generating a virtual cryptic note, the virtual cryptic note including the first portion of the message arranged in a first orientation, and the second portion of the message arranged in a second orientation that is rotated relative to the first orientation with the letters and/or numbers of the second portion of the message overlapping the letters and/or numbers of the first portion of the message; and
   providing the virtual cryptic note to the user.

2. The method of claim 1, further comprising using the virtual cryptic note to produce a real cryptic note embodied on an article of manufacture.

3. The method of claim 1, wherein receiving includes receiving the message from the user with the first portion of the message differentiated from the second portion of the message by the user.

4. The method of claim 1, wherein providing includes displaying the virtual cryptic note to the user.

5. The method of claim 4, wherein displaying includes, in response to user input, graphically displaying the virtual cryptic note on one or more virtual surfaces to reveal the message.

6. The method of claim 4, further comprising, in response to user input, virtually manipulating a message portion and/or the virtual cryptic note to permit viewing of at least one of the message portions.

7. The method of claim 4, wherein displaying includes graphically displaying at least one of the message portions of the virtual cryptic note in two and/or three dimensions of a virtual coordinate frame.

8. The method of claim 1, wherein the method is performed as part of a game made available to the user through the user interface.

9. The method of claim 1, further comprising receiving from the user one or more of the following parameters for use in generating the virtual cryptic note: color, text font, font size, text manipulation, shape of the virtual cryptic note, one or more viewing angles, one or more areas and/or extents of transparency, and a number of the message portions.

10. The method of claim 1, further comprising, in response to user input, transmitting the virtual cryptic note to a third party.

11. The method of claim 1, further comprising:
   receiving from the user a selection of a text font for at least one of the message portions in the virtual cryptic note;
   based on the selection, using a text font file to obtain shapes of one or more of the letters and/or numbers of said one or more portions; and
   manipulating the letter and/or number shapes to fit the one or more of the letters and/or numbers within a perimeter of the virtual cryptic note.

12. The method of claim 11, wherein manipulating includes elongating the one or more letters and/or numbers.

13. The method of claim 1, wherein at least one of the message portions includes one or more images.

14. The method of claim 13, wherein the one or more images includes one or more of the following: a symbol, text, a logo, a mark, a drawing, a photograph, and a picture.

15. The method of claim 1, wherein the user interface is provided through one or more of the following: the computer, a second computer, a website, a software application, a telephone, a mobile device, and a kiosk.

16. A computer-implemented method comprising:
   receiving a virtual cryptic note including a message having at least first and second portions, each portion of the message including letters and/or numbers, the first portion arranged in a first orientation and the second portion arranged in a second orientation that is rotated relative to the first orientation with the letters and/or numbers of the second portion of the message overlapping the letters and/or numbers of the first portion of the message; and
   displaying the virtual cryptic note via a user interface of a computer device.

17. The method of claim 16, wherein the virtual cryptic note is received via a network.

18. The method of claim 16, wherein the displaying is performed interactively based on user input via the user interface.

19. The method of claim 16, further comprising, in response to user input, virtually manipulating at least one of the message portions of the virtual cryptic note to display the one or more manipulated message portions in a deciphered form.

20. The method of claim 16, further comprising virtually manipulating the virtual cryptic note as a whole.

* * * * *